United States Patent
Kumar et al.

(10) Patent No.: US 10,922,978 B2
(45) Date of Patent: *Feb. 16, 2021

(54) CONTROLLING AUTONOMOUS VEHICLES TO PROVIDE AUTOMATED EMERGENCY RESPONSE FUNCTIONS

(71) Applicant: Allstate Insurance Company, Northbrook, IL (US)

(72) Inventors: Surender Kumar, Palatine, IL (US); Ryan M. Briggs, Glen Ellyn, IL (US); Mark V. Slusar, Chicago, IL (US); Timothy W. Gibson, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,061

(22) Filed: Aug. 1, 2019

(65) Prior Publication Data

US 2020/0082726 A1 Mar. 12, 2020

Related U.S. Application Data

(63) Continuation of application No. 15/873,316, filed on Jan. 17, 2018, now Pat. No. 10,410,526, which is a (Continued)

(51) Int. Cl.
*G08G 1/00* (2006.01)
*G05D 1/08* (2006.01)
(Continued)

(52) U.S. Cl.
CPC ........... *G08G 1/202* (2013.01); *G05D 1/0088* (2013.01); *G07C 5/008* (2013.01); *G07C 5/02* (2013.01); *G07C 5/0808* (2013.01)

(58) Field of Classification Search
CPC ........ G05D 1/0088; G07C 5/008; G07C 5/02; G07C 5/0808; G08G 1/096725; G08G 1/202; G08G 1/205
See application file for complete search history.

(56) References Cited

U.S. PATENT DOCUMENTS

| 7,024,308 B2 | 4/2006 | Oesterling et al. |
| 8,655,537 B2 | 2/2014 | Ferguson et al. |

(Continued)

FOREIGN PATENT DOCUMENTS

| KR | 101224893 B1 | 1/2013 |
| WO | 2015091637 A1 | 6/2015 |
| WO | 2016026023 A1 | 2/2016 |

OTHER PUBLICATIONS

Thompson, Cadie, "Tech Insider: Here's how Google's self-driving cars know what to do in an emergency situation," Dec. 1, 2015, retrieved May 23, 2016 from http://www.techinsider.io/how-googles-self-driving-cars-respond-to-emergency-sirens-2015-12, 3 pages.

(Continued)

*Primary Examiner* — Tyler J Lee
(74) *Attorney, Agent, or Firm* — Banner & Witcoff, Ltd.

(57) ABSTRACT

Aspects of the disclosure relate to controlling autonomous vehicles to provide automated emergency response functions. A computing platform may receive vehicle data associated with a vehicle from an on-board vehicle monitoring system associated with the vehicle. Subsequently, the computing platform may detect an occurrence of an emergency at a location. Thereafter, the computing platform may select an autonomous vehicle to respond to the emergency at the location based on autonomous vehicle state information. Then, the computing platform may generate one or more dispatch commands directing the autonomous vehicle to move to the location and execute one or more emergency response functions. Subsequently, the computing platform (Continued)

may send, to an on-board autonomous vehicle control system associated with the autonomous vehicle, the one or more dispatch commands directing the autonomous vehicle to move to the location and execute the one or more emergency response functions.

20 Claims, 16 Drawing Sheets

Related U.S. Application Data continuation of application No. 15/281,861, filed on Sep. 30, 2016, now Pat. No. 9,905,133.

(51) Int. Cl.
| | | |
|---|---|---|
| *G07C 5/08* | (2006.01) | |
| *G07C 5/02* | (2006.01) | |
| *G05D 1/00* | (2006.01) | |
| *G07C 5/00* | (2006.01) | |

(56) References Cited

U.S. PATENT DOCUMENTS

| 8,874,301 | B1 | 10/2014 | Rao et al. |
|---|---|---|---|
| 8,874,305 | B2 | 10/2014 | Dolgov et al. |
| 8,909,415 | B1 | 12/2014 | Hawley |
| 9,157,752 | B1 | 10/2015 | Fernandez Garcia et al. |
| 9,278,689 | B1 | 3/2016 | Delp |
| 9,317,983 | B2 | 4/2016 | Ricci |
| 9,599,986 | B1 | 3/2017 | Eberbach et al. |
| 2005/0030224 | A1 | 2/2005 | Koch |
| 2009/0327011 | A1 | 12/2009 | Petroff |
| 2010/0256836 | A1 | 10/2010 | Mudalige |
| 2012/0072051 | A1 | 3/2012 | Koon et al. |
| 2013/0222133 | A1 | 8/2013 | Schultz et al. |
| 2014/0046585 | A1 | 2/2014 | Morris, IV et al. |
| 2014/0214255 | A1 | 7/2014 | Dolgov et al. |
| 2015/0066284 | A1 | 3/2015 | Yopp |
| 2015/0081156 | A1 | 3/2015 | Trepagnier et al. |
| 2015/0134178 | A1 | 5/2015 | Minoiu-Enache |
| 2015/0241226 | A1 | 8/2015 | Engelman et al. |
| 2015/0334545 | A1 | 11/2015 | Maier et al. |
| 2015/0344031 | A1 | 12/2015 | Weisswange |
| 2016/0071418 | A1 | 3/2016 | Oshida et al. |
| 2016/0176408 | A1 | 6/2016 | Lynch |
| 2017/0032585 | A1 | 2/2017 | Stenneth |
| 2017/0185087 | A1 | 6/2017 | Petroff |
| 2017/0213165 | A1 | 7/2017 | Stauffer et al. |

OTHER PUBLICATIONS

Spinelli, Mike, "New BMW's Drive Themselves (Almost)," Popular Science, Jun. 4, 2009, retrieved May 24, 2016 from http://www.popsci.com/cars/article/2009-06/rescued-tech-automomousvehicle-control-system-aids-elderly-drivers, 5 pages.

Steven, Tim, "Inside Volvo's Self-Driving Car: Improving Driver Safety Without the Driver," May 16, 2014, retrieved May 23, 2016 from http://www.cnet.com/roadshow/news/a-ride-in-volvos-autonomous-car-how-the-step-in-driver-safety-requires-replacing-the-driver/, 8 pages.

"Mercedes Safety: Attention Assist, Pre-Safe & Distronic Plus—Mercedes-Benz," retrieved May 23, 2016 from https://www.mbusa.com/mercedes/benz/safety, 10 pages.

Jul. 5, 2017—U.S. Non-Final Office Action—U.S. Appl. No. 15/281,861.

Oct. 26, 2017—U.S. Notice of Allowance—U.S. Appl. No. 15/281,861.

Oct. 25, 2017—(WO) International Search Report—PCT/US17/53898.

Nov. 8, 2017—U.S. Notice of Allowance—U.S. Appl. No. 15/281,861.

Jan. 22, 2019—U.S. Non-Final Office Action—U.S. Appl. No. 15/873,316.

May 6, 2019—U.S. Notice of Allowance—U.S. Appl. No. 15/873,316.

May 5, 2020—EP Supplementary Partial Search Report—App. No. EP17857389.

Aug. 10, 2020—(EP) Extended Search Report—App. No. 17857389.5.

May 20, 2020—(CA) Office Action—App. No. 3038905.

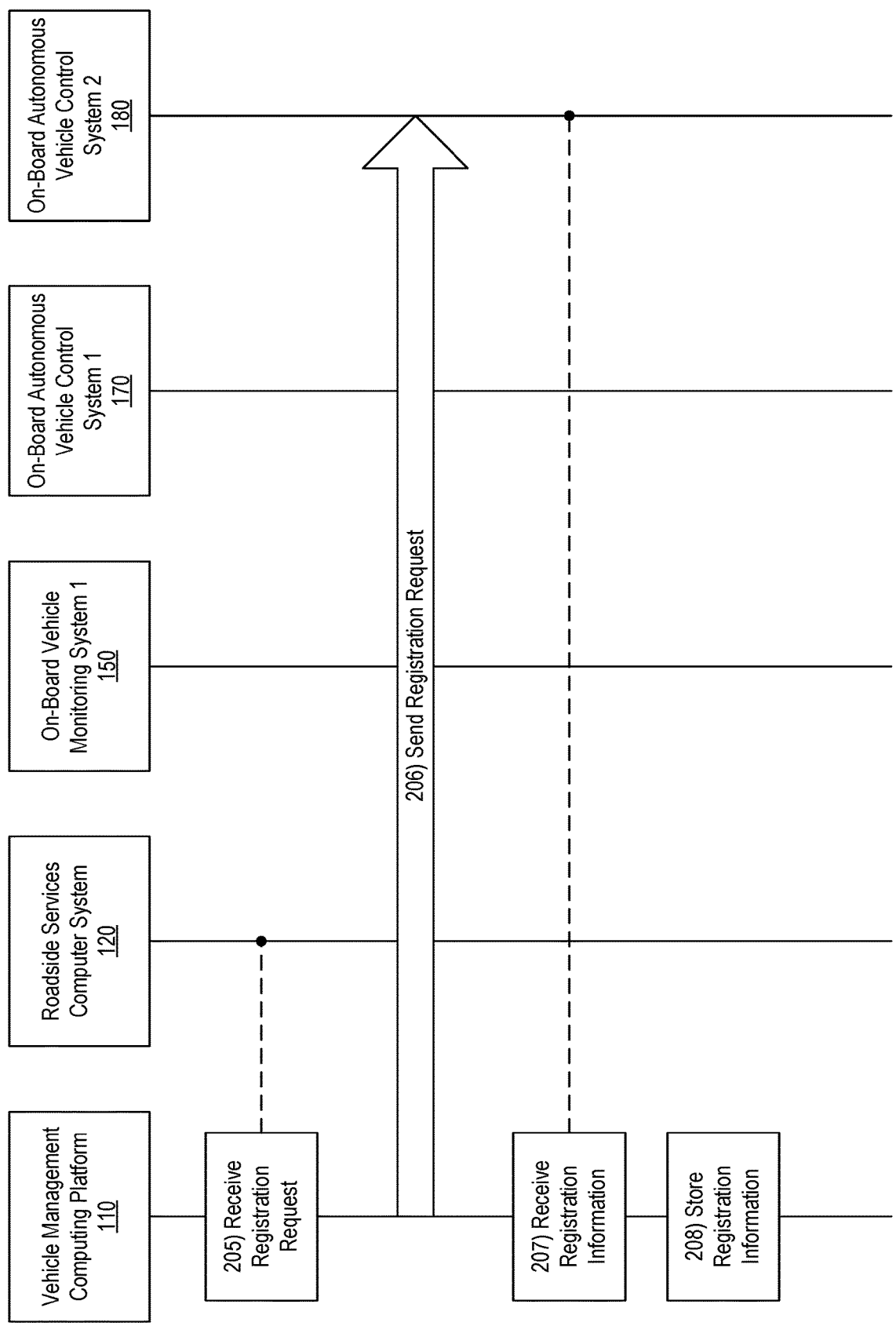

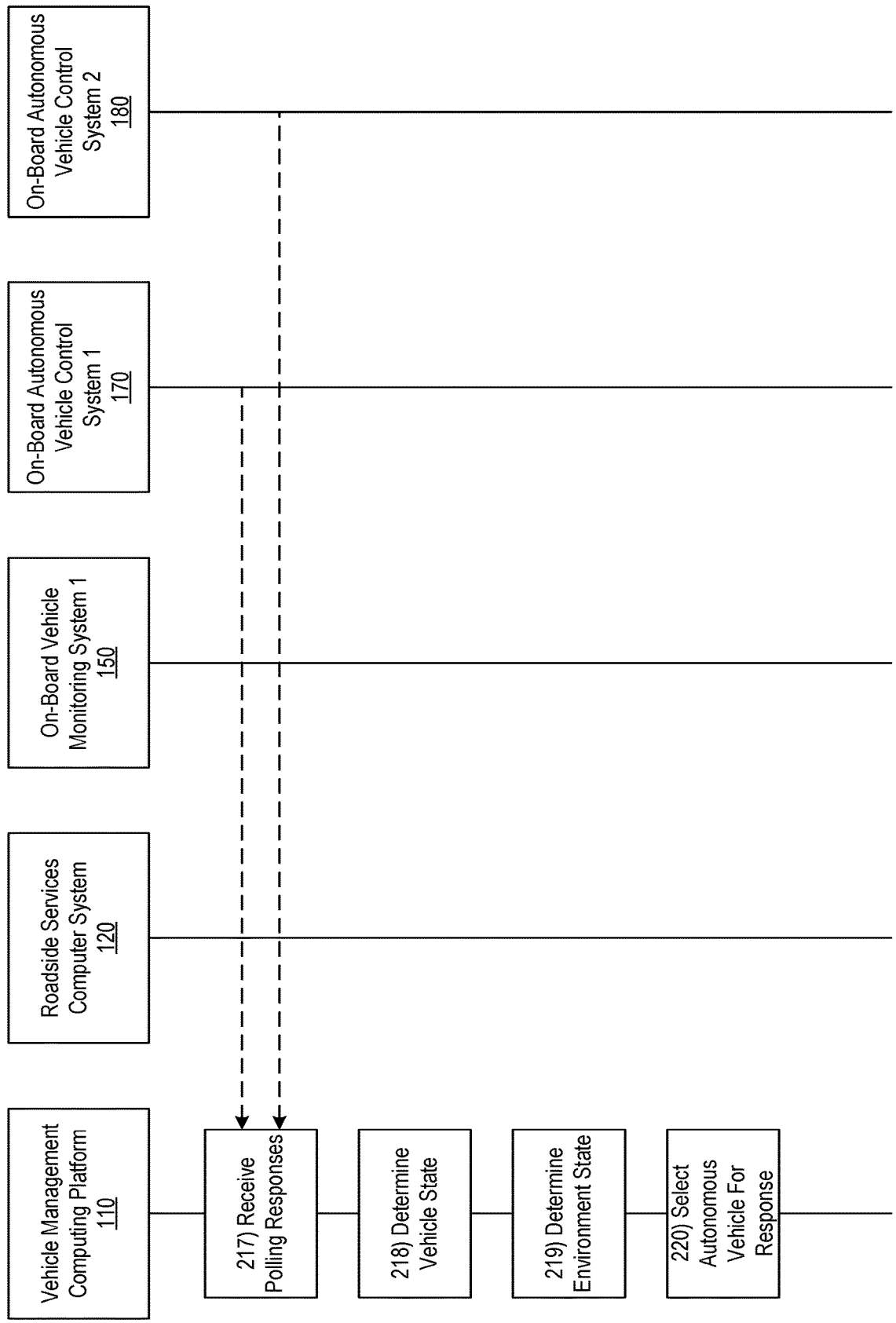

CONTROLLING AUTONOMOUS VEHICLES TO PROVIDE AUTOMATED EMERGENCY RESPONSE FUNCTIONS

CROSS-REFERENCE TO RELATED APPLICATIONS

This application is a continuation of and claims the benefit of priority to U.S. patent application Ser. No. 15/873,316, filed Jan. 17, 2018, and entitled "Controlling Autonomous Vehicles To Provide Automated Emergency Response Functions," which is a continuation of and claims the benefit of priority to U.S. patent application Ser. No. 15/281,861, filed Sep. 30, 2016, and entitled "Controlling Autonomous Vehicles To Provide Automated Emergency Response Functions." Each of the foregoing applications is incorporated by reference herein in its entirety.

BACKGROUND

Aspects of the disclosure relate to vehicle control and guidance systems that may provide remote control of one or more autonomous vehicles. In particular, one or more aspects of the disclosure relate to controlling autonomous vehicles to provide automated emergency response functions.

Autonomous vehicles are becoming increasingly sophisticated as satellite navigation technologies, traffic and pedestrian sensor technologies, and guidance technologies continue to improve. Despite advances in various technologies, however, it may be difficult to control or otherwise direct autonomous vehicles. For example, different autonomous vehicles may have different capabilities, and in some instances, relatively large amounts of information may require decoding and/or other processing to make autonomous vehicles effective and/or useful.

SUMMARY

Aspects of the disclosure provide effective, efficient, scalable, and convenient technical solutions that address and overcome the technical problems associated with controlling autonomous vehicles, particularly in instances in which autonomous vehicles are controlled to provide automated emergency response functions.

In accordance with one or more embodiments, a computing platform having at least one processor, a memory, and a communication interface may receive, via the communication interface, vehicle data associated with a first vehicle from a first on-board vehicle monitoring system associated with the first vehicle. Subsequently, the computing platform may detect an occurrence of an emergency at a first location based on the vehicle data associated with the first vehicle received from the first on-board vehicle monitoring system associated with the first vehicle. Thereafter, the computing platform may select a first autonomous vehicle to respond to the emergency at the first location based on autonomous vehicle state information. Then, the computing platform may generate one or more dispatch commands directing the first autonomous vehicle to move to the first location and execute one or more emergency response functions. Subsequently, the computing platform may send, via the communication interface, to a first on-board autonomous vehicle control system associated with the first autonomous vehicle, the one or more dispatch commands directing the first autonomous vehicle to move to the first location and execute the one or more emergency response functions.

In some embodiments, the vehicle data associated with the first vehicle received from the first on-board vehicle monitoring system associated with the first vehicle may include location data associated with the first vehicle, telematics data associated with the first vehicle, and sensor data associated with the first vehicle.

In some instances, the emergency at the first location may be a natural disaster. In other instances, the emergency at the first location may be an automobile accident involving the first vehicle.

In some embodiments, detecting the occurrence of the emergency at the first location may include detecting the occurrence of the emergency at the first location based on vehicle data associated with the first autonomous vehicle received from the first on-board autonomous vehicle control system associated with the first autonomous vehicle.

In some embodiments, detecting the occurrence of the emergency at the first location may include detecting the occurrence of the emergency at the first location based on a disaster alert received from an emergency alert computer system.

In some embodiments, selecting the first autonomous vehicle to respond to the emergency at the first location based on the autonomous vehicle state information may include determining, based on the autonomous vehicle state information, that the first autonomous vehicle is the closest available autonomous vehicle to the first location of a plurality of available autonomous vehicles within a predetermined distance of the first location.

In some embodiments, generating the one or more dispatch commands directing the first autonomous vehicle to move to the first location and execute the one or more emergency response functions may include generating at least one dispatch command directing the first autonomous vehicle to deliver emergency supplies to the first location, provide medical functions at the first location, capture one or more pictures at the first location, collect claims processing information at the first location, or provide emergency transport for one or more injured persons at the first location.

In some embodiments, generating the one or more dispatch commands directing the first autonomous vehicle to move to the first location and execute the one or more emergency response functions may include generating at least one dispatch command directing the first autonomous vehicle to a supplies loading unit.

In some embodiments, the computing platform may receive, via the communication interface, from the first on-board vehicle monitoring system associated with the first vehicle, vehicle monitoring registration information associated with the first vehicle. Subsequently, the computing platform may store the vehicle monitoring registration information associated with the first vehicle received from the first on-board vehicle monitoring system associated with the first vehicle in a vehicle management database maintained by the computing platform.

In some embodiments, the computing platform may receive, via the communication interface, from the first on-board autonomous vehicle control system associated with the first autonomous vehicle, autonomous vehicle registration information associated with the first autonomous vehicle. Subsequently, the computing platform may store the autonomous vehicle registration information associated with the first autonomous vehicle received from the first on-board autonomous vehicle control system associated with the first autonomous vehicle in a vehicle management database maintained by the computing platform.

In some embodiments, the computing platform may receive, via the communication interface, from a second on-board autonomous vehicle control system associated with a second autonomous vehicle, autonomous vehicle registration information associated with the second autonomous vehicle. Subsequently, the computing platform may store the autonomous vehicle registration information associated with the second autonomous vehicle received from the second on-board autonomous vehicle control system associated with the second autonomous vehicle in the vehicle management database maintained by the computing platform.

In some embodiments, the computing platform may generate, for a plurality of autonomous vehicles, a plurality of polling requests requesting updated state information from a plurality of on-board autonomous vehicle control systems associated with the plurality of autonomous vehicles. Subsequently, the computing platform may send, via the communication interface, to the plurality of on-board autonomous vehicle control systems associated with the plurality of autonomous vehicles, the plurality of polling requests requesting the updated state information from the plurality of on-board autonomous vehicle control systems associated with the plurality of autonomous vehicles. Thereafter, the computing platform may receive, via the communication interface, from the plurality of on-board autonomous vehicle control systems associated with the plurality of autonomous vehicles, a plurality of polling responses. Then, the computing platform may generate the autonomous vehicle state information based on the plurality of polling responses received from the plurality of on-board autonomous vehicle control systems associated with the plurality of autonomous vehicles.

In some embodiments, the computing platform may generate environment state information based on environment data received from an environmental data computer system. In addition, generating the one or more dispatch commands directing the first autonomous vehicle to move to the first location and execute the one or more emergency response functions may include generating at least one dispatch command based on the environment state information.

In some embodiments, the computing platform may select a second autonomous vehicle to respond to the emergency at the first location based on the autonomous vehicle state information. Subsequently, the computing platform may generate one or more dispatch commands directing the second autonomous vehicle to move to the first location and execute one or more emergency response functions. Thereafter, the computing platform may send, via the communication interface, to a second on-board autonomous vehicle control system associated with the second autonomous vehicle, the one or more dispatch commands directing the second autonomous vehicle to move to the first location and execute the one or more emergency response functions.

In some embodiments, the computing platform may receive, via the communication interface, from the first on-board autonomous vehicle control system associated with the first autonomous vehicle, incident data collected by the first on-board autonomous vehicle control system associated with the first autonomous vehicle at the first location. In some instances, the incident data collected by the first on-board autonomous vehicle control system associated with the first autonomous vehicle at the first location may include information identifying one or more supplies used at the first location in responding to the emergency at the first location, information identifying a nature of the emergency at the first location, or claims processing information received by the first on-board autonomous vehicle control system associated with the first autonomous vehicle at the first location.

In some embodiments, the computing platform may generate an incident report based on the incident data received from the first on-board autonomous vehicle control system associated with the first autonomous vehicle. Subsequently, the computing platform may send, via the communication interface, to an emergency services computer system, the incident report generated based on the incident data received from the first on-board autonomous vehicle control system associated with the first autonomous vehicle. In addition, sending the incident report generated based on the incident data received from the first on-board autonomous vehicle control system associated with the first autonomous vehicle to the emergency services computer system may cause the emergency services computer system to display the incident report generated based on the incident data received from the first on-board autonomous vehicle control system associated with the first autonomous vehicle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, 2E, 2F, and 2G depict an illustrative event sequence for controlling autonomous vehicles to provide automated emergency response functions in accordance with one or more example embodiments;

DETAILED DESCRIPTION

Figure 1A:
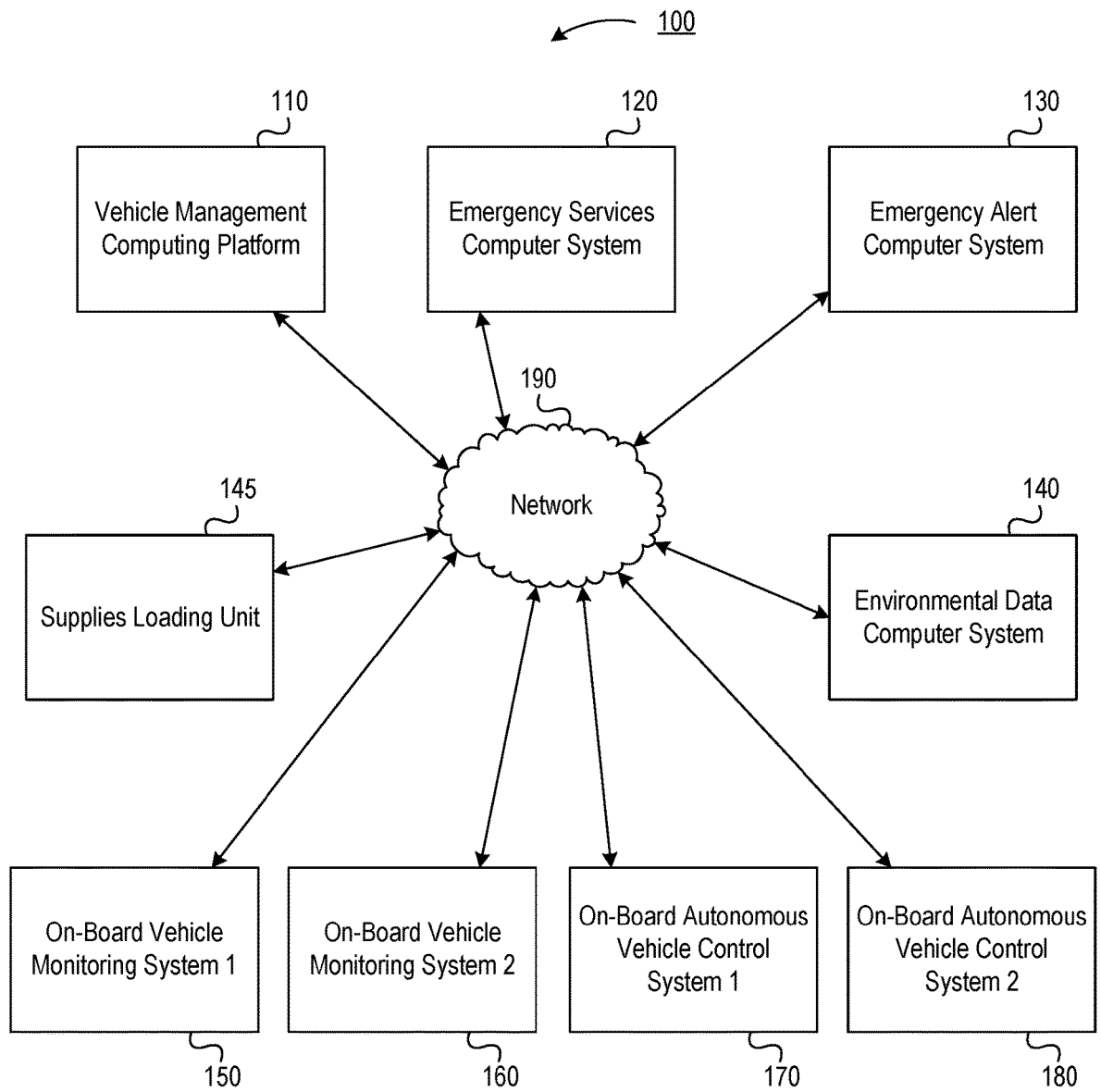
FIGS. 1A, 1B, 1C, 1D, 1E, and 1F depict an illustrative operating environment for controlling autonomous vehicles to provide automated emergency response functions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to controlling autonomous vehicles to provide automated emergency response functions. For example, one or more aspects of the disclosure relate to a system for using autonomous vehicles in emergency situations. In some instances, an autonomous vehicle may be dispatched to a disaster area or scene of an accident and may include particular information, medical equipment, medications, and/or the like to aid in treating victims. In some instances, the emergency may be detected via sensors in a user's vehicle and the system may then identify an autonomous vehicle in the area having appropriate equipment and dispatch the autonomous vehicle to the scene. If an autonomous vehicle is part of the accident, the vehicle may be equipped to perform functions such as releasing a seat belt, enriching the vehicle with oxygen, and/or the like. As illustrated in greater detail below, some aspects of the disclosure provide a computing platform that may be configured to perform a method comprising triggering an autonomous emergency mode, assessing a situation and/or type of emergency, and using a rules engine to execute one or more actions, such as remotely controlling a vehicle and its operations, sending one or more notifications, and/or performing other actions.

In some instances, an emergency mode may be triggered by a human driver of a vehicle manually selecting or changing an operating mode of the vehicle to an autonomous emergency mode using a control presented on the dashboard of the vehicle. In some instances, the emergency mode may be triggered based on one or more wearable devices monitoring a health condition (e.g., sensing conditions indicative of a serious health condition, such as symptoms of a heart attack) of the manual driver or a passenger of the vehicle. In some instances, a protocol may trigger the autonomous emergency mode (e.g., a passenger in an autonomous vehicle may place a 911 call from his or her mobile phone and provide details of the autonomous or driverless vehicle that he or she is riding in, and the police may remotely trigger the emergency autonomous mode of operation of the vehicle based on receiving the call).

In some instances, a process may be executed to allow authorized access to a vehicle onboard communication and/or control system. This may provide remote control of the vehicle and its operations while mitigating cyber-security risks to the vehicle.

In some instances, the vehicle may be routed to a new destination and/or may perform one or more actions. For example, arriving at the destination in the shortest time to the new destination may be more important than taking the route having the lowest risk (e.g., in accordance with a risk map) to the original destination. For instance, it may be important to route the vehicle to the nearest hospital in some cases or move the vehicle to the side of the road or a shoulder of a highway. In addition, the vehicle control system may notify nearby paramedics and/or police in case of an emergency. In some instances, a roadside services department or subsidiary of an insurance company may offer emergency autonomous service to customers and/or other subscribers (e.g., even in instances in which the vehicle is not insured by the insurance company).

In some instances, in addition to entering an emergency autonomous mode, an autonomous vehicle may send a notification to the nearest family member of each driver and/or passenger of the vehicle (e.g., based on driver profile information and/or passenger profile information), send a notification to a dealership (e.g., indicating that the vehicle may require repair), send a notification to a babysitter, and/or send a notification to a blood bank or hospital (e.g., indicating that a blood transfusion may be needed). Additionally or alternatively, the autonomous vehicle may provide services of an ambulance, shock a person in the vehicle to provide automated defibrillation based on detecting that the person's heart has stopped, contact an ambulance, send a notification to a doctor that is nearby, update an electronic calendar, notify contacts based on electronic calendar and/or electronic organizer information, and/or transport passengers to a hospital or other medical center. Additionally or alternatively, the autonomous vehicle may direct and/or cause other vehicles to move out of the way, transmit insurance policy information (e.g., to an automobile insurance company, to a hospital, and/or the like), transmit vital signs information, roll down one or more windows, turn on an air conditioning system in the vehicle, open one or more doors of the vehicle, release one or more seatbelts in the vehicle, provide cardiopulmonary resuscitation (CPR), release a puff of air (e.g., to wake up a person in the vehicle), enrich the vehicle with oxygen, provide an electric zap or buzz in a vehicle seat, and/or send a notification to a hospital. In some instances, the vehicle may send one or more signals requesting assistance, send one or more signals requesting service, drive to a dedicated repair facility, enter a maintenance mode, disable itself if being chased by police, pull over and/or disable itself (e.g., based on detecting that it has been stolen), and/or lock doors and drive to a police station (e.g., based on detecting that it has been stolen). In some instances, the vehicle may present one or more user interfaces and/or other information on an electronic display in the vehicle.

In some instances, an autonomous vehicle may detect and/or determine that an emergency has occurred based on biometrics, based on the way in which the vehicle is being driven, based on detecting a flat tire or low gas level, based on a button in the car being pressed to indicate an emergency, based on voice activation, based on another vehicle observing the vehicle driving erratically, based on other devices in the vehicle detecting that the vehicle is being driven poorly, and/or based on input and/or information received from a mobile application running on a smart phone.

In some instances, an autonomous vehicle may determine and/or utilize an emergency route in the event of an emergency, as opposed to a non-emergency route that may be determined and/or utilized under non-emergency conditions. In some instances, an autonomous vehicle may provide pharmaceutical medication to a person in the vehicle. In some instances, a drone may deliver and/or otherwise provide the medication to the vehicle and/or the person in the vehicle. In some instances, a drone may deliver and/or otherwise provide materials and/or supplies for the vehicle (e.g., coolant) and/or materials and/or supplies for the person in the vehicle (e.g., medication, such as an epi-pen or other emergency medication). In some instances, such materials and/or supplies may be provided by another autonomous vehicle nearby having the needed materials and/or supplies. In some instances, the autonomous vehicle may have systems built into it that are configured to provide vital services, such as defibrillation. In some instances, the autonomous vehicle may be controlled by a remote system that may remotely determine and/or direct where the autonomous vehicle is to go and/or how the autonomous vehicle is to go there.

In some instances, an autonomous vehicle may provide instructions to people in the vehicle. In some instances, an autonomous vehicle may allow people to get out of the vehicle before traveling to an emergency destination, such as a hospital. In some instances, an autonomous vehicle may transfer people from one vehicle to another vehicle. In some instances, an autonomous vehicle may receive data from one or more sensors in the vehicle and provide information to one or more remote systems based on the data received from the one or more sensors in the vehicle. In some instances, an autonomous vehicle may provide and/or execute one or more automated responses in cases of detecting theft, detecting unauthorized entry, determining based on geo-fencing that the vehicle is being operated outside of an authorized area, detecting an inebriated driver, recognizing that the vehicle has been stolen (e.g., based on a driving pattern not matching a usual driving pattern), and/or detecting a high-pitched siren.

In some instances, an autonomous vehicle may detect and/or respond to a natural disaster. The autonomous vehicle may behave differently after detecting a natural disaster. For instance, a number of autonomous vehicles may decrease, and/or people may share autonomous vehicles. In some instances, after detecting a natural disaster, an autonomous vehicle may leave a catastrophe zone automatically and/or on its own. In some instances, an autonomous vehicle may be used to transport people out of a catastrophe area. In some instances, an autonomous vehicle may be used to retrieve items from homes or other dwelling places. In some instances, an autonomous vehicle may analyze an insurance claims area. In some instances, an autonomous vehicle may be deployed to a location where a person's insured or covered car has been damaged. In some instances, an autonomous vehicle may select and/or adjust a route based on information identifying details of the catastrophe. In some instances, if an issue with the autonomous vehicle arises (e.g., low oil, low tire pressure, and/or the like), the autonomous vehicle may change its route, and/or an operator of the autonomous vehicle may send and/or otherwise provide services.

In some instances, depending on a level of service and/or subscription selected by a user, different levels of service may be provided by an autonomous vehicle. In some instances, an autonomous vehicle may utilize one or more passenger profiles and/or other user profiles (which may, e.g., indicate that a passenger and/or user have agreed in advance that their personal information may be shared in certain instances).

FIGS. 1A, 1B, 1C, 1D, 1E, and 1F depict an illustrative operating environment for controlling autonomous vehicles to provide automated emergency response functions in accordance with one or more example embodiments. Referring to FIG. 1A, operating environment 100 may include a vehicle management computing platform 110, an emergency services computer system 120, an emergency alert computer system 130, an environmental data computer system 140, a supplies loading unit 145, an on-board vehicle monitoring system 150, an on-board vehicle monitoring system 160, an on-board autonomous vehicle control system 170, and an on-board autonomous vehicle control system 180. In one or more arrangements, vehicle management computing platform 110, emergency services computer system 120, emergency alert computer system 130, environmental data computer system 140, supplies loading unit 145, on-board vehicle monitoring system 150, on-board vehicle monitoring system 160, on-board autonomous vehicle control system 170, and on-board autonomous vehicle control system 180 may be connected by network 190, which may include one or more wired networks and/or one or more wireless networks. In addition, each of vehicle management computing platform 110, emergency services computer system 120, emergency alert computer system 130, environmental data computer system 140, on-board vehicle monitoring system 150, on-board vehicle monitoring system 160, on-board autonomous vehicle control system 170, and on-board autonomous vehicle control system 180 may be special purpose computing devices configured to perform specific functions, as illustrated in greater detail below, and may include specific computing components such as processors, memories, communication interfaces, and/or the like. Further, supplies loading unit 145 may include one or more special purpose computing devices configured to perform specific functions, as illustrated in greater detail below, and further may include specific computing components such as processors, memories, communication interfaces, and/or the like.

For example, vehicle management computing platform 110 may be configured to control one or more autonomous vehicles to provide one or more automated emergency response functions, as illustrated in greater detail below. Emergency services computer system 120 may be configured to be used by an administrative user of an organization operating vehicle management computing platform 110, for example, to enter, define, and/or otherwise provide one or more settings, definitions, and/or commands that may be used by and/or otherwise affect the functions performed by vehicle management computing platform 110 and/or the other computing devices included in operating environment 100. Emergency alert computer system 130 may be configured to generate and/or send emergency alerts (which may, e.g., include alerts identifying the occurrence of a natural disaster in a specific location) and/or other information to vehicle management computing platform 110 and/or one or more other computing devices included in operating environment 100. Environmental data computer system 140 may be configured to collect and/or send environmental data (which may, e.g., include information identifying weather conditions at a specific location, traffic conditions at a specific location, road closures and/or construction conditions at a specific location, and/or the like) and/or other information to vehicle management computing platform 110 and/or one or more other computing devices included in operating environment 100. Supplies loading unit 145 may be configured to load, refill, and/or otherwise provide one or more supplies to one or more autonomous vehicles and/or other vehicles. In some instances, supplies loading unit 145 may be an automated supplies loading facility that is located at a predefined fixed location. In other instances, supplies loading unit 145 may be may be a mobile supplies loading unit that may be dispatched to arrive at a disaster area. Such a supplies loading unit may, for instance, be automated or non-automated. In some instances, supplies loading unit 145 may be a drone, such as an airborne drone, land-based drone, or other robotic drone device. Such a drone may be registered with vehicle management computing platform 110 and/or emergency services computer system 120 to deliver and/or otherwise provide supplies to one or more autonomous vehicles and/or other vehicles (e.g., when operating in an emergency mode).

On-board vehicle monitoring system 150 may be configured to monitor and/or send vehicle data (which may, e.g., include speed data, position data, vehicle information, passenger information, and/or the like) associated with a first non-autonomous vehicle to vehicle management computing platform 110 and/or one or more other computing devices included in operating environment 100. On-board vehicle monitoring system 160 may be configured to monitor and/or send vehicle data (which may, e.g., include speed data, position data, vehicle information, passenger information, and/or the like) associated with a second non-autonomous vehicle to vehicle management computing platform 110 and/or one or more other computing devices included in operating environment 100.

On-board autonomous vehicle control system 170 may be configured to monitor and/or send vehicle data (which may, e.g., include speed data, position data, vehicle information, passenger information, and/or the like) associated with a first autonomous vehicle to vehicle management computing platform 110 and/or one or more other computing devices included in operating environment 100. In addition, on-board autonomous vehicle control system 170 may be configured to control the first autonomous vehicle based on commands and/or other information received from vehicle management computing platform 110 and/or one or more other computing devices included in operating environment 100. On-board autonomous vehicle control system 180 may be configured to monitor and/or send vehicle data (which may, e.g., include speed data, position data, vehicle information, passenger information, and/or the like) associated with a second autonomous vehicle to vehicle management computing platform 110 and/or one or more other computing devices included in operating environment 100. In addition, on-board autonomous vehicle control system 180 may be configured to control the second autonomous vehicle based on commands and/or other information received from vehicle management computing platform 110 and/or one or more other computing devices included in operating environment 100.

Figure 1B:
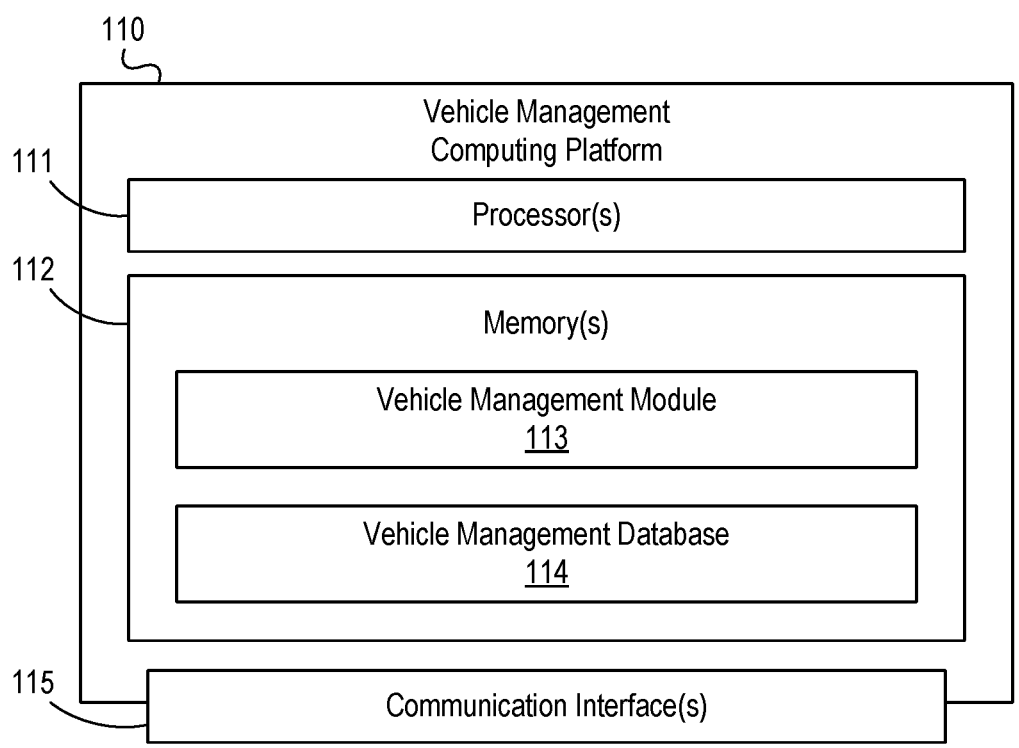

Referring to FIG. 1B, vehicle management computing platform 110 may include a processor 111, memory 112, and a communication interface 115. Processor 111 may control operations of vehicle management computing platform 110, and memory 112 may store instructions that, when executed by processor 111, cause vehicle management computing platform 110 to perform one or more functions. Communication interface 115 may include one or more wired and/or wireless network interfaces, and communication interface 115 may connect vehicle management computing platform 110 to one or more networks (e.g., network 190) and/or enable vehicle management computing platform 110 to exchange information and/or otherwise communicate with one or more devices connected to such networks. Memory 112 may store and/or otherwise provide a vehicle management module 113 and a vehicle management database 114. Vehicle management module 113 may store instructions that, when executed by processor 111, cause vehicle management computing platform 110 to control one or more autonomous vehicles to provide automated emergency response functions and/or perform one or more other functions. Vehicle management database 114 may store information that may be used by vehicle management computing platform 110 in controlling autonomous vehicles to provide automated emergency response functions and/or in performing one or more other functions.

Figure 1C:
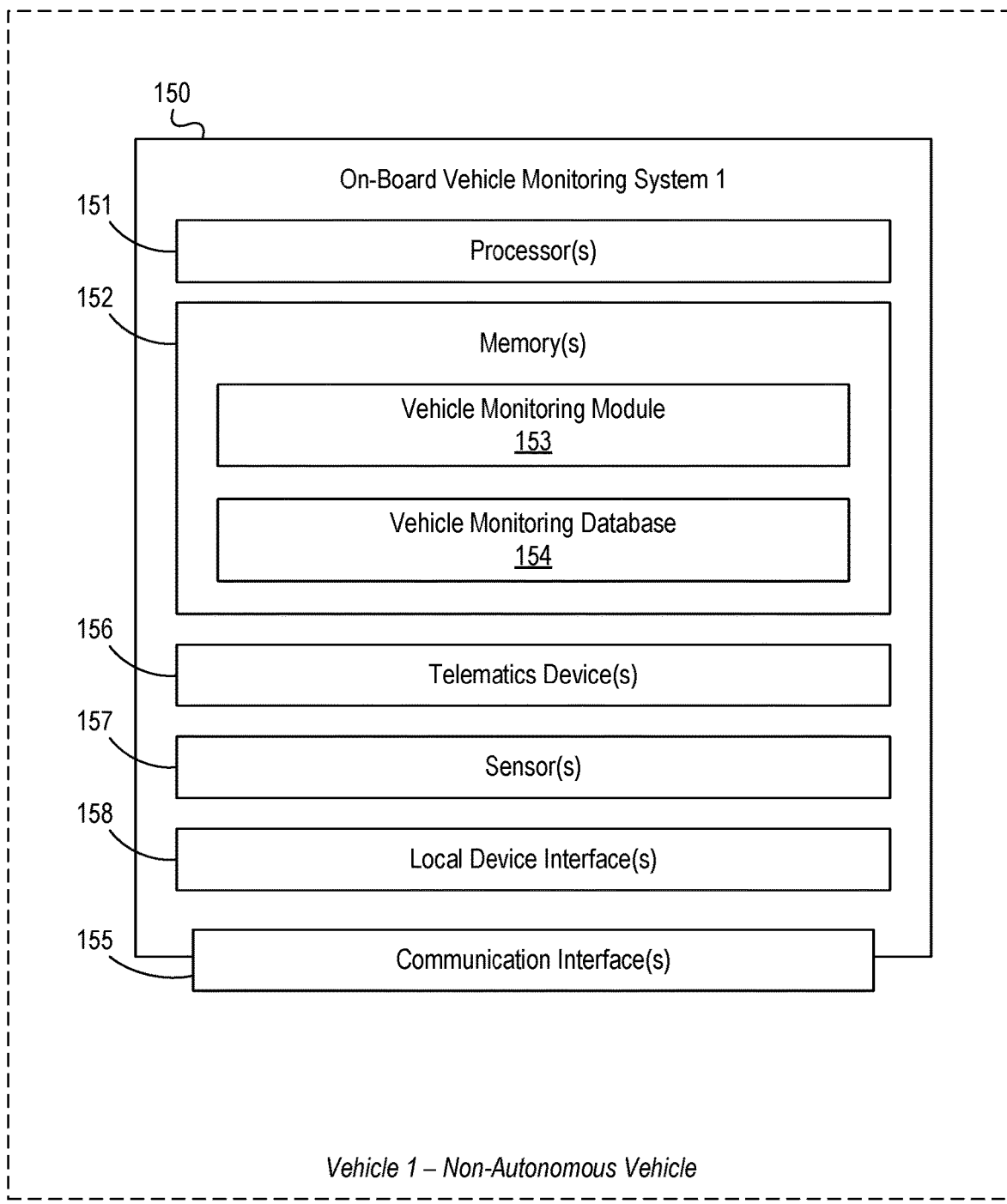

Referring to FIG. 1C, on-board vehicle monitoring system 150 may include a processor 151, memory 152, and a communication interface 155. Processor 151 may control operations of on-board vehicle monitoring system 150, and memory 152 may store instructions that, when executed by processor 151, cause on-board vehicle monitoring system 150 to perform one or more functions. Communication interface 155 may include one or more wired and/or wireless network interfaces, and communication interface 155 may connect on-board vehicle monitoring system 150 to one or more networks (e.g., network 190) and/or enable on-board vehicle monitoring system 150 to exchange information and/or otherwise communicate with one or more devices connected to such networks. Memory 152 may store and/or otherwise provide a vehicle monitoring module 153 and a vehicle monitoring database 154. Vehicle monitoring module 153 may store instructions that, when executed by processor 151, cause on-board vehicle monitoring system 150 to monitor a vehicle in which on-board vehicle monitoring system 150 may be installed and/or perform one or more other functions. Vehicle monitoring database 154 may store information that may be used by on-board vehicle monitoring system 150 in monitoring a vehicle in which on-board vehicle monitoring system 150 may be installed and/or in performing one or more other functions. On-board vehicle monitoring system 150 also may include a telematics device 156, sensors 157, and a local device interface 158. Telematics device 156 may collect telematics data associated with a vehicle in which on-board vehicle monitoring system 150 may be installed, including engine data, performance data, position data, speed data, and/or other vehicle telematics data. Sensors 157 may sense conditions associated with a vehicle in which on-board vehicle monitoring system 150 may be installed and may output analog signal data and/or digital signal data to telematics device 156 and/or on-board vehicle monitoring system 150. Local device interface 158 may include one or more wired and/or wireless communication interfaces and may, for example, enable on-board vehicle monitoring system 150 to exchange information with and/or otherwise communicate with one or more devices that may be located inside of, close to, and/or within a predetermined distance of a vehicle in which on-board vehicle monitoring system 150 may be installed. For example, local device interface 158 may enable on-board vehicle monitoring system 150 to communicate with one or more smart phones, tablet computers, and/or other mobile computing devices that may be used by and/or otherwise associated with a driver of and/or one or more passengers of a vehicle in which on-board vehicle monitoring system 150 may be installed.

Figure 1D:
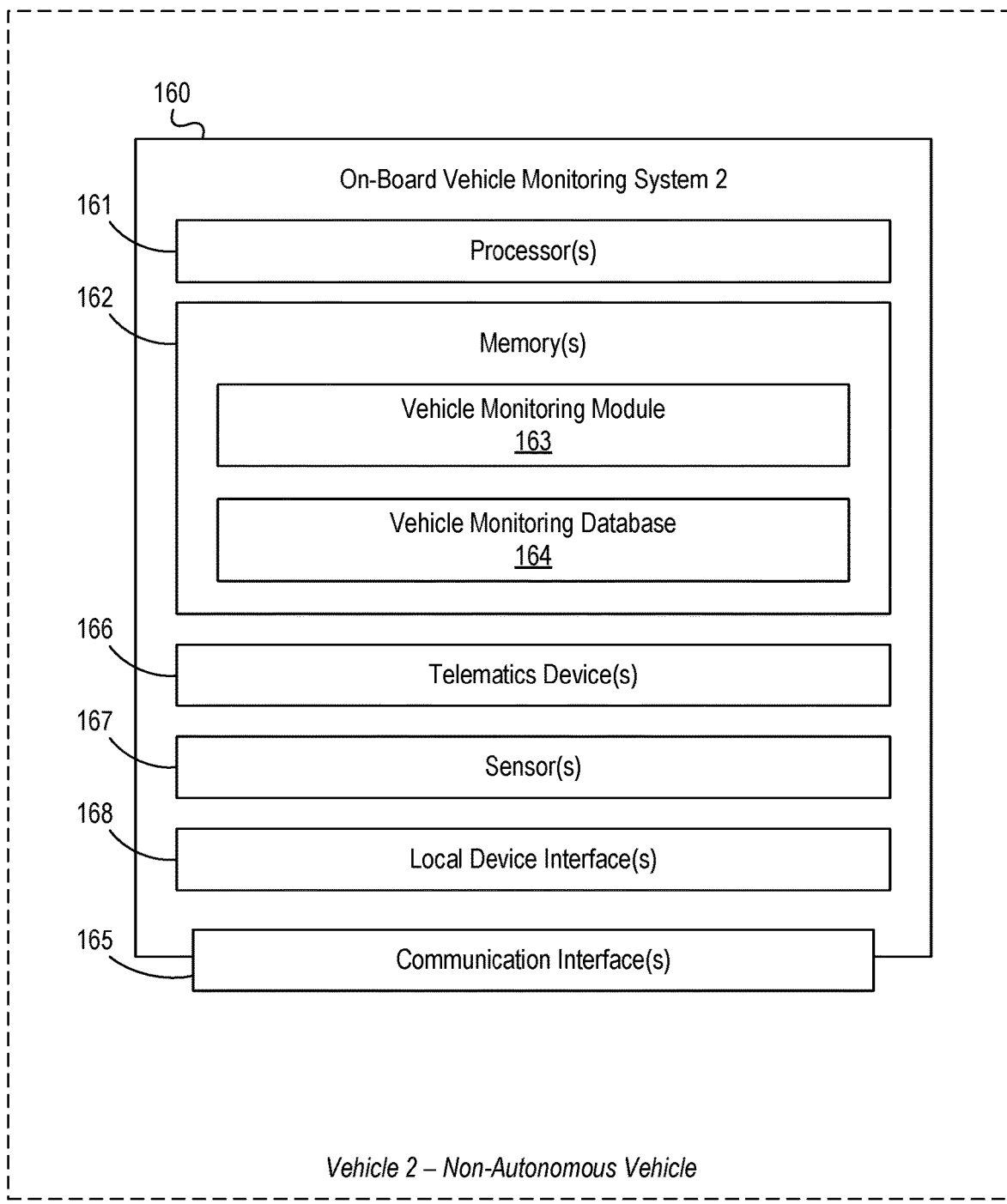

Referring to FIG. 1D, on-board vehicle monitoring system 160 may include a processor 161, memory 162, and a communication interface 165. Processor 161 may control operations of on-board vehicle monitoring system 160, and memory 162 may store instructions that, when executed by processor 161, cause on-board vehicle monitoring system 160 to perform one or more functions. Communication interface 165 may include one or more wired and/or wireless network interfaces, and communication interface 165 may connect on-board vehicle monitoring system 160 to one or more networks (e.g., network 190) and/or enable on-board vehicle monitoring system 160 to exchange information and/or otherwise communicate with one or more devices connected to such networks. Memory 162 may store and/or otherwise provide a vehicle monitoring module 163 and a vehicle monitoring database 164. Vehicle monitoring module 163 may store instructions that, when executed by processor 161, cause on-board vehicle monitoring system 160 to monitor a vehicle in which on-board vehicle monitoring system 160 may be installed (which may, e.g., be different from the vehicle in which on-board vehicle monitoring system 150 may be installed) and/or perform one or more other functions. Vehicle monitoring database 164 may store information that may be used by on-board vehicle monitoring system 160 in monitoring a vehicle in which on-board vehicle monitoring system 160 may be installed and/or in performing one or more other functions. On-board vehicle monitoring system 160 also may include a telematics device 166, sensors 167, and a local device interface 168. Telematics device 166 may collect telematics data associated with a vehicle in which on-board vehicle monitoring system 160 may be installed, including engine data, performance data, position data, speed data, and/or other vehicle telematics data. Sensors 167 may sense conditions associated with a vehicle in which on-board vehicle monitoring system 160 may be installed and may output analog signal data and/or digital signal data to telematics device 166 and/or on-board vehicle monitoring system 160. Local device interface 168 may include one or more wired and/or wireless communication interfaces and may, for example, enable on-board vehicle monitoring system 160 to exchange information with and/or otherwise communicate with one or more devices that may be located inside of, close to, and/or within a predetermined distance of a vehicle in which on-board vehicle monitoring system 160 may be installed. For example, local device interface 168 may enable on-board vehicle monitoring system 160 to communicate with one or more smart phones, tablet computers, and/or other mobile computing devices that may be used by and/or otherwise associated with a driver of and/or one or more passengers of a vehicle in which on-board vehicle monitoring system 160 may be installed.

Figure 1E:
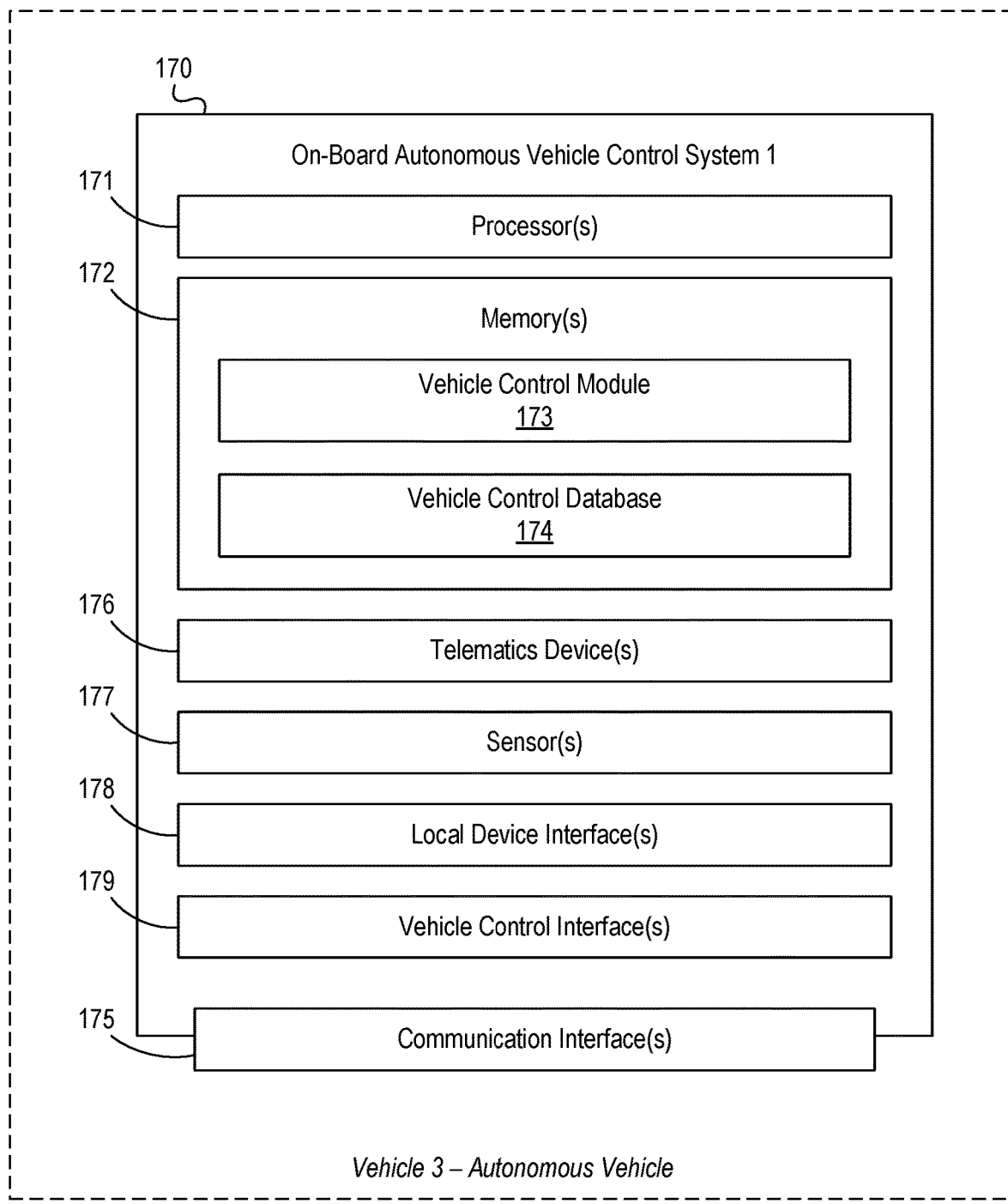

Referring to FIG. 1E, on-board autonomous vehicle control system 170 may include a processor 171, memory 172, and a communication interface 175. Processor 171 may control operations of on-board autonomous vehicle control system 170, and memory 172 may store instructions that, when executed by processor 171, cause on-board autonomous vehicle control system 170 to perform one or more functions. Communication interface 175 may include one or more wired and/or wireless network interfaces, and communication interface 175 may connect on-board autonomous vehicle control system 170 to one or more networks (e.g., network 190) and/or enable on-board autonomous vehicle control system 170 to exchange information and/or otherwise communicate with one or more devices connected to such networks. Memory 172 may store and/or otherwise provide a vehicle control module 173 and a vehicle control database 174. Vehicle control module 173 may store instructions that, when executed by processor 171, cause on-board autonomous vehicle control system 170 to monitor and/or control an autonomous vehicle in which on-board autonomous vehicle control system 170 may be installed and/or perform one or more other functions. Vehicle control database 174 may store information that may be used by on-board autonomous vehicle control system 170 in monitoring and/or controlling an autonomous vehicle in which on-board autonomous vehicle control system 170 may be installed and/or in performing one or more other functions.

On-board autonomous vehicle control system 170 also may include a telematics device 176, sensors 177, a local device interface 178, and a vehicle control interface 179. Telematics device 176 may collect telematics data associated with an autonomous vehicle in which on-board autonomous vehicle control system 170 may be installed, including engine data, performance data, position data, speed data, and/or other vehicle telematics data. Sensors 177 may sense conditions associated with an autonomous vehicle in which on-board autonomous vehicle control system 170 may be installed and may output analog signal data and/or digital signal data to telematics device 176 and/or on-board autonomous vehicle control system 170. Local device interface 178 may include one or more wired and/or wireless communication interfaces and may, for example, enable on-board autonomous vehicle control system 170 to exchange information with and/or otherwise communicate with one or more devices that may be located inside of, close to, and/or within a predetermined distance of an autonomous vehicle in which on-board autonomous vehicle control system 170 may be installed. For example, local device interface 178 may enable on-board autonomous vehicle control system 170 to communicate with one or more smart phones, tablet computers, and/or other mobile computing devices that may be used by and/or otherwise associated with a driver of and/or one or more passengers of an autonomous vehicle in which on-board autonomous vehicle control system 170 may be installed. Vehicle control interface 179 may include one or more wired and/or wireless communication interfaces and may, for example, enable on-board autonomous vehicle control system 170 to exchange information with and/or otherwise communicate with one or more devices and/or components of an autonomous vehicle in which on-board autonomous vehicle control system 170 may be installed so as to direct and/or control the autonomous vehicle in which on-board autonomous vehicle control system 170 may be installed. For example, vehicle control interface 179 may enable on-board autonomous vehicle control system 170 to accelerate and/or decelerate the autonomous vehicle in which on-board autonomous vehicle control system 170 may be installed, steer the autonomous vehicle in which on-board autonomous vehicle control system 170 may be installed, direct the autonomous vehicle in which on-board autonomous vehicle control system 170 may be installed to one or more specific locations, drive the autonomous vehicle in which on-board autonomous vehicle control system 170 may be installed, and/or otherwise control operations of the autonomous vehicle in which on-board autonomous vehicle control system 170 may be installed.

Figure 1F:
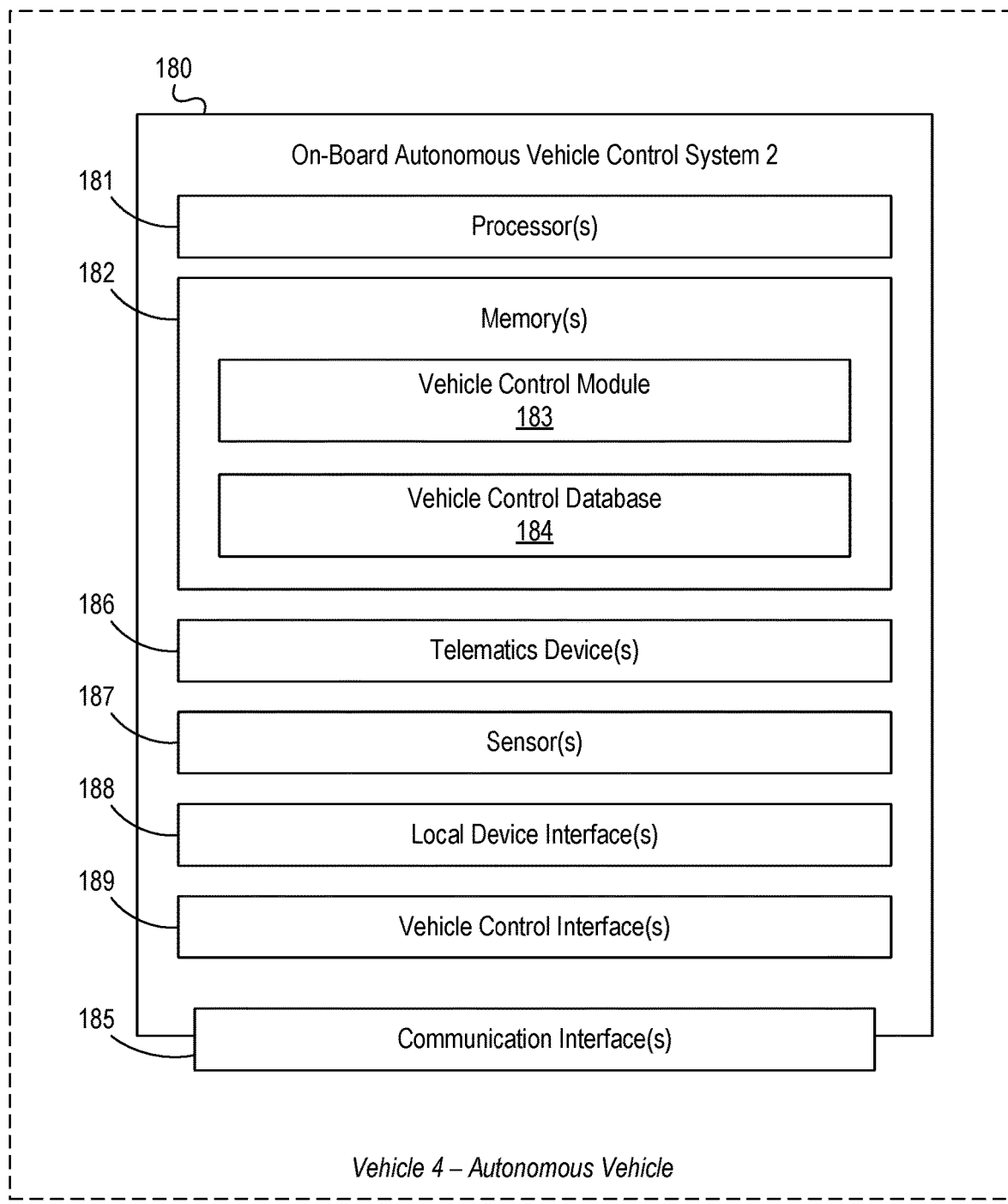

Referring to FIG. 1F, on-board autonomous vehicle control system 180 may include a processor 181, memory 182, and a communication interface 185. Processor 181 may control operations of on-board autonomous vehicle control system 180, and memory 182 may store instructions that, when executed by processor 181, cause on-board autonomous vehicle control system 180 to perform one or more functions. Communication interface 185 may include one or more wired and/or wireless network interfaces, and communication interface 185 may connect on-board autonomous vehicle control system 180 to one or more networks (e.g., network 190) and/or enable on-board autonomous vehicle control system 180 to exchange information and/or otherwise communicate with one or more devices connected to such networks. Memory 182 may store and/or otherwise provide a vehicle control module 183 and a vehicle control database 184. Vehicle control module 183 may store instructions that, when executed by processor 181, cause on-board autonomous vehicle control system 180 to monitor and/or control an autonomous vehicle in which on-board autonomous vehicle control system 180 may be installed (which may, e.g., be different from the vehicle in which on-board autonomous vehicle control system 170 may be installed) and/or perform one or more other functions. Vehicle control database 184 may store information that may be used by on-board autonomous vehicle control system 180 in monitoring and/or controlling an autonomous vehicle in which on-board autonomous vehicle control system 180 may be installed and/or in performing one or more other functions.

On-board autonomous vehicle control system 180 also may include a telematics device 186, sensors 187, a local device interface 188, and a vehicle control interface 189. Telematics device 186 may collect telematics data associated with an autonomous vehicle in which on-board autonomous vehicle control system 180 may be installed, including engine data, performance data, position data, speed data, and/or other vehicle telematics data. Sensors 187 may sense conditions associated with an autonomous vehicle in which on-board autonomous vehicle control system 180 may be installed and may output analog signal data and/or digital signal data to telematics device 186 and/or on-board autonomous vehicle control system 180. Local device interface 188 may include one or more wired and/or wireless communication interfaces and may, for example, enable on-board autonomous vehicle control system 180 to exchange information with and/or otherwise communicate with one or more devices that may be located inside of, close to, and/or within a predetermined distance of an autonomous vehicle in which on-board autonomous vehicle control system 180 may be installed. For example, local device interface 188 may enable on-board autonomous vehicle control system 180 to communicate with one or more smart phones, tablet computers, and/or other mobile computing devices that may be used by and/or otherwise associated with a driver of and/or one or more passengers of an autonomous vehicle in which on-board autonomous vehicle control system 180 may be installed. Vehicle control interface 189 may include one or more wired and/or wireless communication interfaces and may, for example, enable on-board autonomous vehicle control system 180 to exchange information with and/or otherwise communicate with one or more devices and/or components of an autonomous vehicle in which on-board autonomous vehicle control system 180 may be installed so as to direct and/or control the autonomous vehicle in which on-board autonomous vehicle control system 180 may be installed. For example, vehicle control interface 189 may enable on-board autonomous vehicle control system 180 to accelerate and/or decelerate the autonomous vehicle in which on-board autonomous vehicle control system 180 may be installed, steer the autonomous vehicle in which on-board autonomous vehicle control system 180 may be installed, direct the autonomous vehicle in which on-board autonomous vehicle control system 180 may be installed to one or more specific locations, drive the autonomous vehicle in which on-board autonomous vehicle control system 180 may be installed, and/or otherwise control operations of the autonomous vehicle in which on-board autonomous vehicle control system 180 may be installed.

Figure 2A:
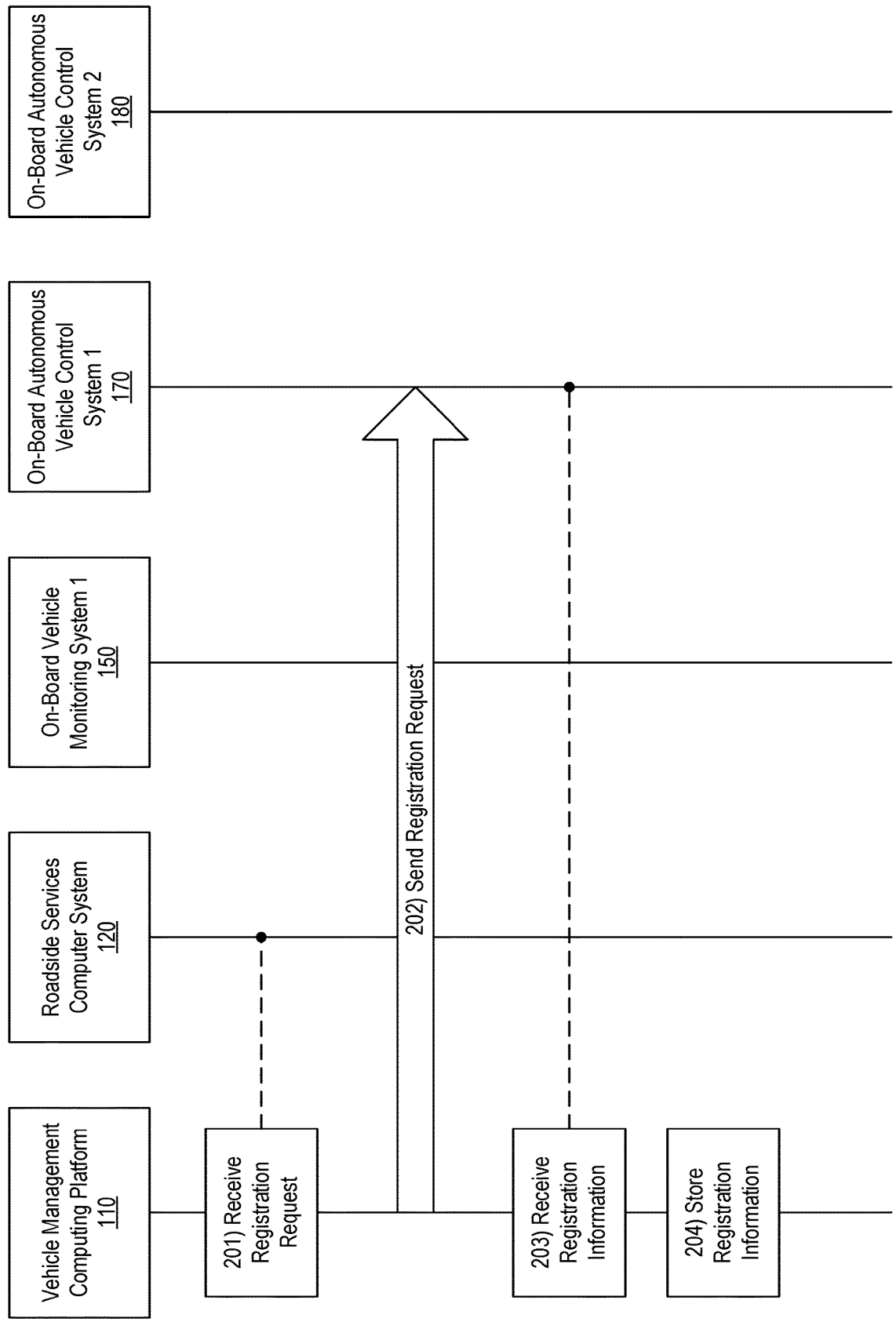

FIGS. 2A, 2B, 2C, 2D, 2E, 2F, and 2G depict an illustrative event sequence for controlling autonomous vehicles to provide automated emergency response functions in accordance with one or more example embodiments. Referring to FIG. 2A, at step 201, vehicle management computing platform 110 may receive a registration request from emergency services computer system 120 (e.g., requesting to register on-board autonomous vehicle control system 170). In some instances, in receiving a registration request from emergency services computer system 120 (e.g., requesting to register on-board autonomous vehicle control system 170), vehicle management computing platform 110 may generate and/or send one or more graphical user interfaces to emergency services computer system 120, which may direct and/or cause emergency services computer system 120 to display and/or otherwise present the one or more graphical user interfaces generated by vehicle management computing platform 110. For example, in receiving a registration request from emergency services computer system 120 (e.g., requesting to register on-board autonomous vehicle control system 170), vehicle management computing platform 110 may cause emergency services computer system 120 to display and/or otherwise present a graphical user interface similar to graphical user interface 300, which is illustrated in FIG. 3. As seen in FIG. 3, graphical user interface 300 may include text and/or other information associated with an autonomous vehicle and/or an autonomous vehicle control system associated with the autonomous vehicle being registered with vehicle management computing platform 110 (e.g., "Vehicle Name: Autonomous Vehicle AAA; Vehicle ID: XXX.XXX.XXX.XXX; Vehicle Base Location: YYYY/ZZZZ; Vehicle Capabilities: Click to View/Edit"), as well as one or more user-selectable options and/or other controls enabling a user of emergency services computer system 120 interacting with graphical user interface 300 to enter, define, and/or modify settings and/or other information associated with the autonomous vehicle and/or the autonomous vehicle control system associated with the autonomous vehicle being registered with vehicle management computing platform 110. In some instances, at step 201, vehicle management computing platform 110 may additionally or alternatively receive a registration request from emergency services computer system 120 requesting to register supplies loading unit 145 and/or one or more other supplies loading units. Such a registration request may include information identifying a current location of supplies loading unit 145 and/or one or more other supplies loading units, capability information associated with supplies loading unit 145 and/or one or more other supplies loading units, and/or other information associated with supplies loading unit 145 and/or one or more other supplies loading units. Such information may, for instance, be used by vehicle management computing platform 110 in dispatching supplies loading unit 145 and/or one or more other supplies loading units. For example, depending on the type of a particular emergency situation that arises and the locations of supplies loading unit 145 and/or one or more other supplies loading units, vehicle management computing platform 110 may select a particular supplies loading unit to dispatch to provide service in connection with and/or otherwise respond to the particular emergency situation.

At step 202, vehicle management computing platform 110 may send a registration request to on-board autonomous vehicle control system 170. For example, at step 202, based on receiving a registration request from emergency services computer system 120 requesting to register on-board autonomous vehicle control system 170 and/or an autonomous vehicle in which on-board autonomous vehicle control system 170 is installed and/or otherwise associated with, vehicle management computing platform 110 may send a registration request to on-board autonomous vehicle control system 170. At step 203, vehicle management computing platform 110 may receive registration information from on-board autonomous vehicle control system 170. For example, at step 203, vehicle management computing platform 110 may receive, via a communication interface (e.g., communication interface 115), from a first on-board autonomous vehicle control system associated with a first autonomous vehicle (e.g., on-board autonomous vehicle control system 170), autonomous vehicle registration information associated with the first autonomous vehicle. Such autonomous vehicle registration information associated with the first autonomous vehicle may, for example, include a name or label associated with the first autonomous vehicle, a unique identifier associated with the first autonomous vehicle, a base location associated with the first autonomous vehicle, capability information associated with the first autonomous vehicle defining one or more capabilities of the first autonomous vehicle, a network address associated with the first autonomous vehicle, and/or other information associated with the first autonomous vehicle. At step 204, vehicle management computing platform 110 may store the registration information received from on-board autonomous vehicle control system 170. For example, at step 204, vehicle management computing platform 110 may store the autonomous vehicle registration information associated with the first autonomous vehicle received from the first on-board autonomous vehicle control system associated with the first autonomous vehicle (e.g., on-board autonomous vehicle control system 170) in a vehicle management database (e.g., vehicle management database 114) maintained by the computing platform (e.g., vehicle management computing platform 110).

Referring to FIG. 2B, at step 205, vehicle management computing platform 110 may receive a registration request from emergency services computer system 120 (e.g., requesting to register on-board autonomous vehicle control system 180). For example, at step 205, vehicle management computing platform 110 may receive a registration request from emergency services computer system 120 requesting to register on-board autonomous vehicle control system 180, similar to how vehicle management computing platform 110 may receive a registration request from emergency services computer system 120 requesting to register on-board autonomous vehicle control system 170 in the example discussed above.

At step 206, vehicle management computing platform 110 may send a registration request to on-board autonomous vehicle control system 180. For example, at step 206, based on receiving a registration request from emergency services computer system 120 requesting to register on-board autonomous vehicle control system 180 and/or an autonomous vehicle in which on-board autonomous vehicle control system 180 is installed and/or otherwise associated with, vehicle management computing platform 110 may send a registration request to on-board autonomous vehicle control system 180. At step 207, vehicle management computing platform 110 may receive registration information from on-board autonomous vehicle control system 180. For example, at step 207, vehicle management computing platform 110 may receive, via the communication interface (e.g., communication interface 115), from a second on-board autonomous vehicle control system associated with a second autonomous vehicle (e.g., on-board autonomous vehicle control system 180), autonomous vehicle registration information associated with the second autonomous vehicle. Such autonomous vehicle registration information associated with the second autonomous vehicle may, for example, include a name or label associated with the second autonomous vehicle, a unique identifier associated with the second autonomous vehicle, a base location associated with the second autonomous vehicle, capability information associated with the second autonomous vehicle defining one or more capabilities of the second autonomous vehicle, a network address associated with the second autonomous vehicle, and/or other information associated with the second autonomous vehicle. At step 208, vehicle management computing platform 110 may store the registration information received from on-board autonomous vehicle control system 180. For example, at step 208, vehicle management computing platform 110 may store the autonomous vehicle registration information associated with the second autonomous vehicle received from the second on-board autonomous vehicle control system associated with the second autonomous vehicle (e.g., on-board autonomous vehicle control system 180) in the vehicle management database (e.g., vehicle management database 114) maintained by the computing platform (e.g., vehicle management computing platform 110).

Figure 2C:
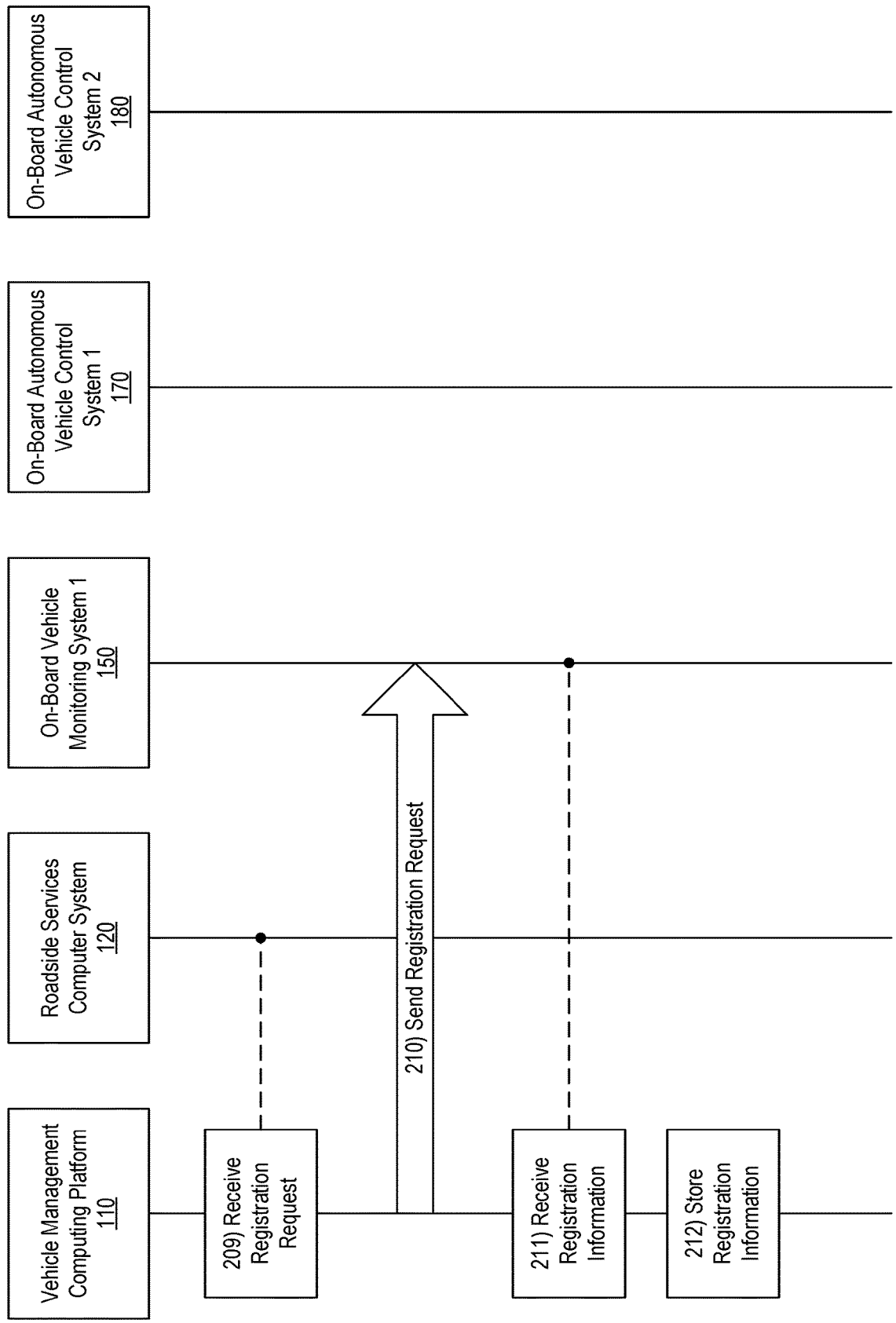
Figure 3:
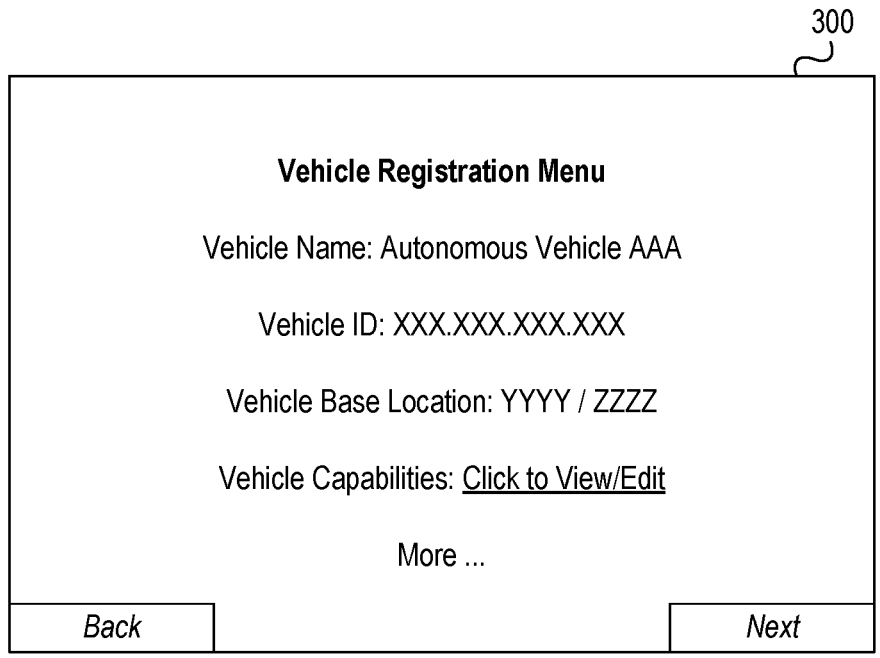
FIGS. 3, 4, 5, and 6 depict example graphical user interfaces for controlling autonomous vehicles to provide automated emergency response functions in accordance with one or more example embodiments.
Figure 4:
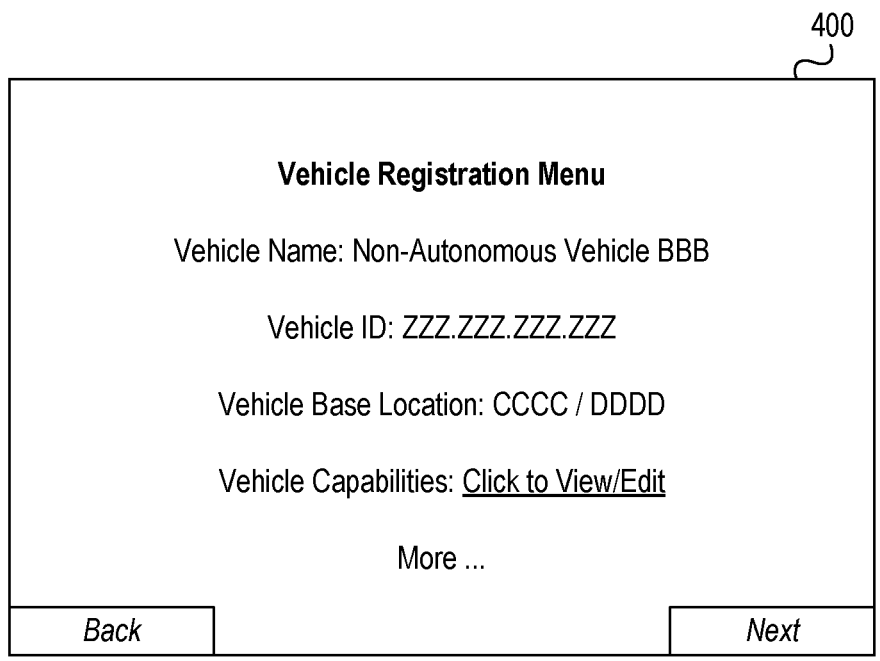

Referring to FIG. 2C, at step 209, vehicle management computing platform 110 may receive a registration request from emergency services computer system 120 (e.g., requesting to register on-board vehicle monitoring system 150). In some instances, in receiving a registration request from emergency services computer system 120 (e.g., requesting to register on-board vehicle monitoring system 150), vehicle management computing platform 110 may generate and/or send one or more graphical user interfaces to emergency services computer system 120, which may direct and/or cause emergency services computer system 120 to display and/or otherwise present the one or more graphical user interfaces generated by vehicle management computing platform 110. For example, in receiving a registration request from emergency services computer system 120 (e.g., requesting to register on-board vehicle monitoring system 150), vehicle management computing platform 110 may cause emergency services computer system 120 to display and/or otherwise present a graphical user interface similar to graphical user interface 400, which is illustrated in FIG. 4. As seen in FIG. 4, graphical user interface 400 may include text and/or other information associated with a non-autonomous vehicle and/or a non-autonomous vehicle monitoring system associated with the non-autonomous vehicle being registered with vehicle management computing platform 110 (e.g., "Vehicle Name: Non-Autonomous Vehicle BBB; Vehicle ID: ZZZ.ZZZ.ZZZ.ZZZ; Vehicle Base Location: CCCC/DDDD; Vehicle Capabilities: Click to View/Edit"), as well as one or more user-selectable options and/or other controls enabling a user of emergency services computer system 120 interacting with graphical user interface 400 to enter, define, and/or modify settings and/or other information associated with the non-autonomous vehicle and/or the non-autonomous vehicle control system associated with the autonomous vehicle being registered with vehicle management computing platform 110.

At step 210, vehicle management computing platform 110 may send a registration request to on-board vehicle monitoring system 150. For example, at step 210, based on receiving a registration request from emergency services computer system 120 requesting to register on-board vehicle monitoring system 150 and/or a non-autonomous vehicle in which on-board vehicle monitoring system 150 is installed and/or otherwise associated with, vehicle management computing platform 110 may send a registration request to on-board vehicle monitoring system 150. At step 211, vehicle management computing platform 110 may receive registration information from on-board vehicle monitoring system 150. For example, at step 211, vehicle management computing platform 110 may receive, via the communication interface (e.g., communication interface 115), from a first on-board vehicle monitoring system associated with a first vehicle (e.g., on-board vehicle monitoring system 150), vehicle monitoring registration information associated with the first vehicle. Such vehicle monitoring registration information associated with the first vehicle may, for example, include a name or label associated with the first vehicle, a unique identifier associated with the first vehicle, a base location associated with the first vehicle, capability information associated with the first vehicle defining one or more capabilities of the first vehicle, a network address associated with the first vehicle, and/or other information associated with the first vehicle. At step 212, vehicle management computing platform 110 may store the registration information received from on-board vehicle monitoring system 150. For example, at step 212, vehicle management computing platform 110 may store the vehicle monitoring registration information associated with the first vehicle received from the first on-board vehicle monitoring system associated with the first vehicle (e.g., on-board vehicle monitoring system 150) in a vehicle management database (e.g., vehicle management database 114) maintained by the computing platform (e.g., vehicle management computing platform 110).

Figure 2D:
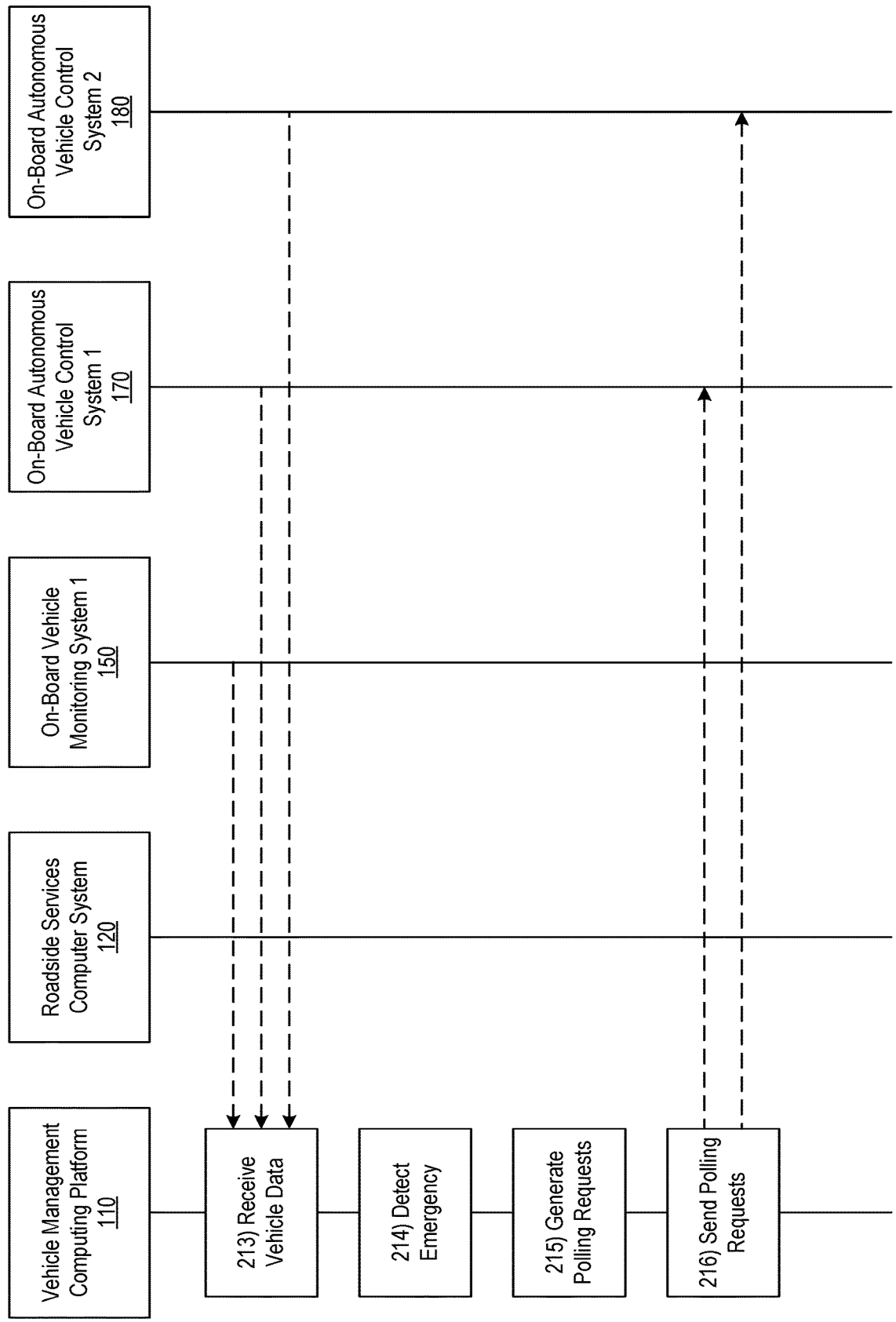

Referring to FIG. 2D, at step 213, vehicle management computing platform 110 may receive vehicle data (e.g., from on-board vehicle monitoring system 150, on-board vehicle monitoring system 160, on-board autonomous vehicle control system 170, on-board autonomous vehicle control system 180). For example, at step 213, vehicle management computing platform 110 may receive, via the communication interface (e.g., communication interface 115), vehicle data associated with a first vehicle from a first on-board vehicle monitoring system associated with the first vehicle (e.g., on-board vehicle monitoring system 150). Vehicle management computing platform 110 may receive such vehicle data so as to monitor the location of the first vehicle, telematics data associated with the first vehicle, environmental conditions and/or operating conditions of the first vehicle, and/or other information associated with the first vehicle.

In some embodiments, the vehicle data associated with the first vehicle received from the first on-board vehicle monitoring system associated with the first vehicle may include location data associated with the first vehicle, telematics data associated with the first vehicle, and sensor data associated with the first vehicle. For example, the vehicle data associated with the first vehicle that may be received at step 213 from the first on-board vehicle monitoring system associated with the first vehicle (e.g., on-board vehicle monitoring system 150) may include location data associated with the first vehicle, telematics data associated with the first vehicle, and sensor data associated with the first vehicle. Such location data may, for instance, include information identifying a position of the first vehicle and/or current geographic coordinates of the first vehicle (which may, e.g., be obtained from a satellite navigation system installed in the first vehicle, such as a global positioning system (GPS) installed in the first vehicle). The telematics data associated with the first vehicle may, for instance, include information such as a current speed of the first vehicle, acceleration and/or deceleration of the first vehicle, and/or the like. The sensor data may, for instance, include information collected by one or more sensors installed in the first vehicle and/or otherwise associated with the first vehicle, such as an interior temperature of the first vehicle, an exterior temperature of the first vehicle, an interior light level of the first vehicle, an exterior light level of the first vehicle, and/or other sensor information.

At step 214, vehicle management computing platform 110 may detect an emergency. For example, at step 214, vehicle management computing platform 110 may detect an occurrence of an emergency at a first location based on the vehicle data associated with the first vehicle received from the first on-board vehicle monitoring system associated with the first vehicle (e.g., on-board vehicle monitoring system 150). For instance, vehicle management computing platform 110 may detect the occurrence of an emergency, such as a flood, a hurricane, a natural disaster, a collision, or another type of emergency, at a specific location based on vehicle data received from on-board vehicle monitoring system 150, on-board vehicle monitoring system 160, on-board autonomous vehicle control system 170, on-board autonomous vehicle control system 180, and/or one or more other systems and/or sources. In some instances, vehicle management computing platform 110 may detect the occurrence of an emergency based on disaster alert information received from emergency alert computer system 130 and/or based on vehicle data received from one or more vehicles and/or vehicle systems (e.g., on-board vehicle monitoring system 150, on-board vehicle monitoring system 160, on-board autonomous vehicle control system 170, on-board autonomous vehicle control system 180, and/or the like). In some instances, vehicle management computing platform 110 may detect an occurrence of an emergency at a particular location involving a particular passenger of a vehicle based on receiving passenger data from one or more vehicles and/or vehicle systems (e.g., on-board vehicle monitoring system 150, on-board vehicle monitoring system 160, on-board autonomous vehicle control system 170, on-board autonomous vehicle control system 180, and/or the like) indicating an emergency involving the particular passenger of the vehicle.

In some instances, the emergency at the first location may be a natural disaster. For example, the emergency detected by vehicle management computing platform 110 at the first location may be a natural disaster, such as a flood, hurricane, earthquake, wildfire, or another type of natural disaster. In some instances, the emergency at the first location may be an automobile accident involving the first vehicle. For example, the emergency detected by vehicle management computing platform 110 at the first location may be an automobile accident involving the first vehicle (which may, e.g., be the vehicle in which on-board vehicle monitoring system 150 is installed).

In some embodiments, detecting the occurrence of the emergency at the first location may include detecting the occurrence of the emergency at the first location based on vehicle data associated with the first autonomous vehicle received from the first on-board autonomous vehicle control system associated with the first autonomous vehicle. For example, in detecting the occurrence of the emergency at the first location, vehicle management computing platform 110 may detect the occurrence of the emergency at the first location based on vehicle data associated with the first autonomous vehicle received by vehicle management computing platform 110 from the first on-board autonomous vehicle control system associated with the first autonomous vehicle (e.g., on-board vehicle monitoring system 150).

In some embodiments, detecting the occurrence of the emergency at the first location may include detecting the occurrence of the emergency at the first location based on a disaster alert received from an emergency alert computer system. For example, in detecting the occurrence of the emergency at the first location, vehicle management computing platform 110 may detect the occurrence of the emergency at the first location based on a disaster alert received by vehicle management computing platform 110 from an emergency alert computer system (e.g., emergency alert computer system 130).

At step 215, vehicle management computing platform 110 may generate one or more polling requests for one or more autonomous vehicles. For example, at step 215, vehicle management computing platform 110 may generate, for a plurality of autonomous vehicles, a plurality of polling requests requesting updated state information from a plurality of on-board autonomous vehicle control systems associated with the plurality of autonomous vehicles (e.g., on-board autonomous vehicle control system 170, on-board autonomous vehicle control system 180, and/or the like). Vehicle management computing platform 110 may, for example, generate such polling requests to identify and/or otherwise determine which autonomous vehicles are available to and/or suitable to respond to the emergency detected by vehicle management computing platform 110.

At step 216, vehicle management computing platform 110 may send the one or more polling requests to one or more autonomous vehicle control systems (e.g., on-board autonomous vehicle control system 170, on-board autonomous vehicle control system 180). For example, at step 216, vehicle management computing platform 110 may send, via the communication interface (e.g., communication interface 115), to the plurality of on-board autonomous vehicle control systems associated with the plurality of autonomous vehicles (e.g., on-board autonomous vehicle control system 170, on-board autonomous vehicle control system 180), the plurality of polling requests requesting the updated state information from the plurality of on-board autonomous vehicle control systems associated with the plurality of autonomous vehicles (e.g., on-board autonomous vehicle control system 170, on-board autonomous vehicle control system 180).

Referring to FIG. 2E, at step 217, vehicle management computing platform 110 may receive one or more polling responses from one or more autonomous vehicle control systems (e.g., on-board autonomous vehicle control system 170, on-board autonomous vehicle control system 180). For example, at step 217, vehicle management computing platform 110 may receive, via the communication interface (e.g., communication interface 115), from the plurality of on-board autonomous vehicle control systems associated with the plurality of autonomous vehicles (e.g., on-board autonomous vehicle control system 170, on-board autonomous vehicle control system 180), a plurality of polling responses. The plurality of polling responses may, for example, include passenger data received from the plurality of on-board autonomous vehicle control systems associated with the plurality of autonomous vehicles (e.g., on-board autonomous vehicle control system 170, on-board autonomous vehicle control system 180) identifying one or more passengers in each of the autonomous vehicles, vehicle telematics data received from the plurality of on-board autonomous vehicle control systems associated with the plurality of autonomous vehicles (e.g., on-board autonomous vehicle control system 170, on-board autonomous vehicle control system 180), vehicle sensor data received from the plurality of on-board autonomous vehicle control systems associated with the plurality of autonomous vehicles (e.g., on-board autonomous vehicle control system 170, on-board autonomous vehicle control system 180) including sensor-captured data from each of the autonomous vehicles and/or identifying sensed conditions at each of the autonomous vehicles, vehicle position data received from the plurality of on-board autonomous vehicle control systems associated with the plurality of autonomous vehicles (e.g., on-board autonomous vehicle control system 170, on-board autonomous vehicle control system 180) identifying current positions of each of the autonomous vehicles, and/or other data received from the plurality of on-board autonomous vehicle control systems associated with the plurality of autonomous vehicles (e.g., on-board autonomous vehicle control system 170, on-board autonomous vehicle control system 180).

At step 218, vehicle management computing platform 110 may determine vehicle state information based on the one or more polling responses received from one or more autonomous vehicle control systems (e.g., on-board autonomous vehicle control system 170, on-board autonomous vehicle control system 180). For example, at step 218, vehicle management computing platform 110 may generate autonomous vehicle state information based on the plurality of polling responses received by vehicle management computing platform 110 from the plurality of on-board autonomous vehicle control systems associated with the plurality of autonomous vehicles (e.g., on-board autonomous vehicle control system 170, on-board autonomous vehicle control system 180). In some instances, vehicle management computing platform 110 may generate the autonomous vehicle state information by compiling the updated state information received from the plurality of on-board autonomous vehicle control systems associated with the plurality of autonomous vehicles (e.g., on-board autonomous vehicle control system 170, on-board autonomous vehicle control system 180).

At step 219, vehicle management computing platform 110 may determine environment state information. For example, at step 219, vehicle management computing platform 110 may generate environment state information based on environment data received by vehicle management computing platform 110 from an environmental data computer system (e.g., environmental data computer system 140). In determining and/or generating the environment state information, vehicle management computing platform 110 may, for instance, request, receive, and/or process environment data from environmental data computer system 140.

At step 220, vehicle management computing platform 110 may select an autonomous vehicle to respond to the emergency (e.g., based on vehicle state, environment state, and/or one or more other factors). For example, at step 220, vehicle management computing platform 110 may select a first autonomous vehicle to respond to the emergency at the first location based on autonomous vehicle state information (e.g., the autonomous vehicle state information generated by vehicle management computing platform 110 at step 218). In some instances, in selecting an autonomous vehicle to respond to the emergency at the first location based on the autonomous vehicle state information, vehicle management computing platform 110 may, for instance, identify and/or select an autonomous vehicle that has the appropriate supplies and/or response capabilities for the detected emergency, that is closest to the detected emergency, and/or that is available to respond to the detected emergency.

In some embodiments, selecting the first autonomous vehicle to respond to the emergency at the first location based on the autonomous vehicle state information may include determining, based on the autonomous vehicle state information, that the first autonomous vehicle is the closest available autonomous vehicle to the first location of a plurality of available autonomous vehicles within a predetermined distance of the first location. For example, in selecting the first autonomous vehicle to respond to the emergency at the first location based on the autonomous vehicle state information, vehicle management computing platform 110 may determine, based on the autonomous vehicle state information, that the first autonomous vehicle is the closest available autonomous vehicle to the first location of a plurality of available autonomous vehicles within a predetermined distance of the first location. In this way, vehicle management computing platform 110 may, for instance, select the closest available (e.g., not currently assisting another person at another location) autonomous vehicle to respond and/or may select the closest available autonomous vehicle having the appropriate supplies and/or any required capabilities (e.g., as the supplies that are available on and/or the particular capabilities of different autonomous vehicles may vary) to respond.

Figure 2F:
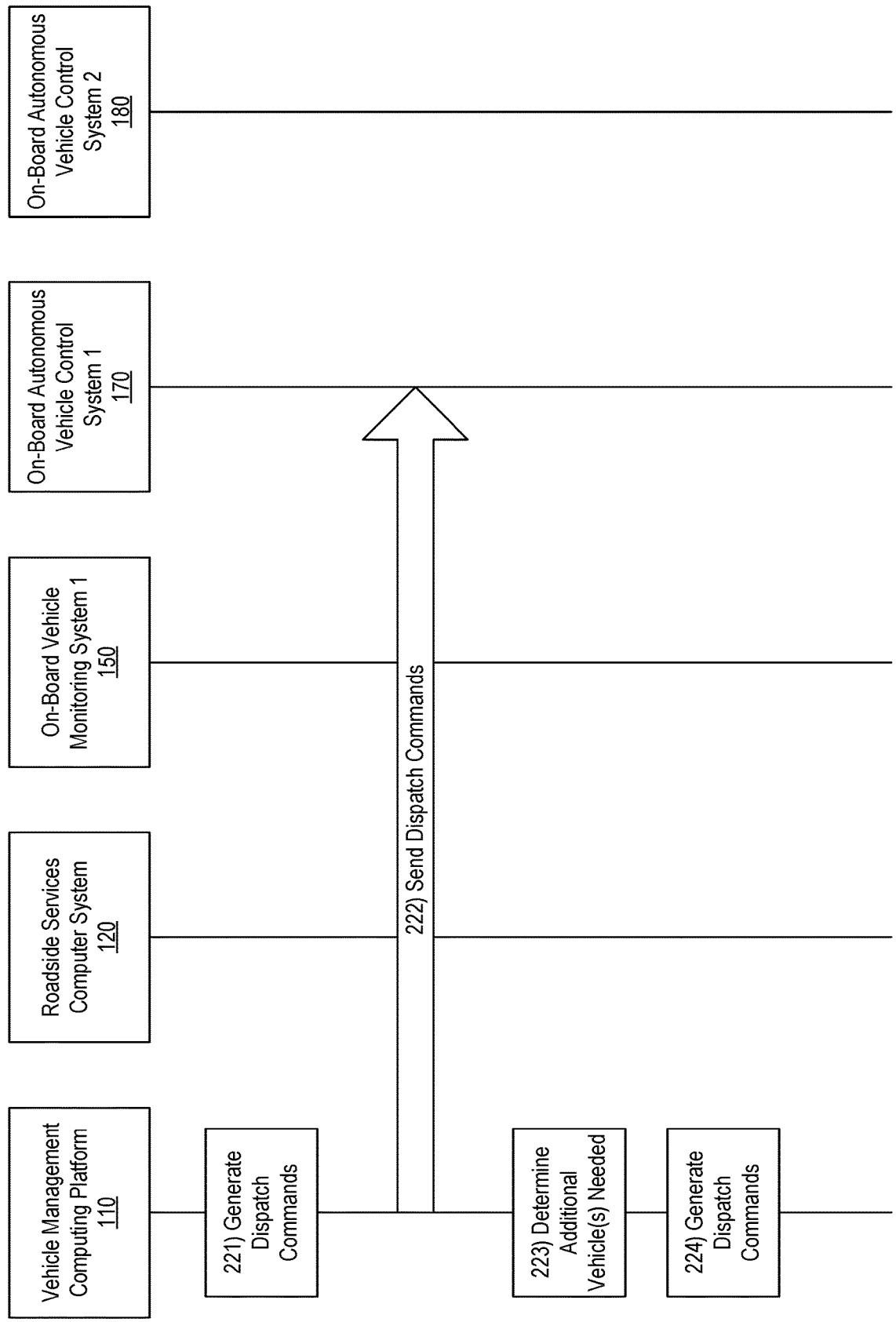

Referring to FIG. 2F, at step 221, vehicle management computing platform 110 may generate one or more dispatch commands. For example, at step 221, vehicle management computing platform 110 may generate one or more dispatch commands directing the first autonomous vehicle to move to the first location and execute one or more emergency response functions. By generating the one or more dispatch commands directing the first autonomous vehicle to move to the first location and execute one or more emergency response functions, vehicle management computing platform 110 may direct and/or otherwise cause the selected autonomous vehicle to respond to the emergency detected by vehicle management computing platform 110. The one or more dispatch commands generated by vehicle management computing platform 110 may include one or more commands directing the first autonomous vehicle to execute one or more emergency response functions, such as delivering supplies to the location where the emergency has been detected, providing medical functions at the location where the emergency has been detected, taking pictures at the location where the emergency has been detected, receiving input (e.g., for insurance claim processing) at the location where the emergency has been detected, functioning as an ambulance to transport injured persons from the location where the emergency has been detected to a medical facility, and/or performing other functions. In some instances, one or more dispatch commands generated by vehicle management computing platform 110 may direct the first autonomous vehicle to an automated loading facility (e.g., where the autonomous vehicle may be automatically loaded with one or more supplies by one or more robotic devices and/or other automated devices before traveling to the location where the emergency has been detected).

In some embodiments, generating the one or more dispatch commands directing the first autonomous vehicle to move to the first location and execute the one or more emergency response functions may include generating at least one dispatch command directing the first autonomous vehicle to deliver emergency supplies to the first location, provide medical functions at the first location, capture one or more pictures at the first location, collect claims processing information at the first location, or provide emergency transport for one or more injured persons at the first location. For example, in generating the one or more dispatch commands directing the first autonomous vehicle to move to the first location and execute the one or more emergency response functions, vehicle management computing platform 110 may generate at least one dispatch command directing the first autonomous vehicle to deliver emergency supplies to the first location, provide medical functions at the first location, capture one or more pictures at the first location, collect claims processing information at the first location, or provide emergency transport for one or more injured persons at the first location.

In some embodiments, generating the one or more dispatch commands directing the first autonomous vehicle to move to the first location and execute the one or more emergency response functions may include generating at least one dispatch command directing the first autonomous vehicle to a supplies loading unit. For example, in generating the one or more dispatch commands directing the first autonomous vehicle to move to the first location and execute the one or more emergency response functions, vehicle management computing platform 110 may generate at least one dispatch command directing the first autonomous vehicle to a supplies loading unit (e.g., supplies loading unit 145). For instance, vehicle management computing platform 110 may direct the first autonomous vehicle to the supplies loading unit to obtain supplies and then on to the location at which the emergency has been detected to respond to the emergency. In some instances, the supplies loading unit may be an automated supplies loading facility that is located at a predefined fixed location. In other instances, the supplies loading unit may be may be a mobile supplies loading unit that may be dispatched and/or otherwise controlled (e.g., by vehicle management computing platform 110) to arrive at a disaster area. Such a supplies loading unit may be automated or non-automated, for example.

In some embodiments, generating the one or more dispatch commands directing the first autonomous vehicle to move to the first location and execute the one or more emergency response functions may include generating at least one dispatch command based on the environment state information. For example, in generating the one or more dispatch commands directing the first autonomous vehicle to move to the first location and execute the one or more emergency response functions, vehicle management computing platform 110 may generate at least one dispatch command based on the environment state information (which may, e.g., have been determined and/or generated by vehicle management computing platform 110 at step 219 based on the environment data received by vehicle management computing platform 110 from environmental data computer system 140). For instance, if vehicle management computing platform 110 has detected a fire as the emergency at a particular location, vehicle management computing platform 110 may generate one or more dispatch commands directing the autonomous vehicle to a perimeter location outside of a potential fire spread area.

At step 222, vehicle management computing platform 110 may send the one or more dispatch commands to an autonomous vehicle control system associated with the autonomous vehicle selected to respond to the emergency. For example, at step 222, vehicle management computing platform 110 may send, via the communication interface (e.g., communication interface 115), to a first on-board autonomous vehicle control system associated with the first autonomous vehicle (e.g., on-board autonomous vehicle control system 170), the one or more dispatch commands directing the first autonomous vehicle to move to the first location and execute the one or more emergency response functions. For instance, vehicle management computing platform 110 may, at step 222, send the one or more dispatch commands to on-board autonomous vehicle control system 170. In response to receiving the one or more dispatch commands from vehicle management computing platform 110, on-board autonomous vehicle control system 170 may, for example, move the autonomous vehicle in which on-board autonomous vehicle control system 170 is installed to the first location and execute the one or more emergency response functions in accordance with the one or more dispatch commands received from vehicle management computing platform 110.

Figure 5:
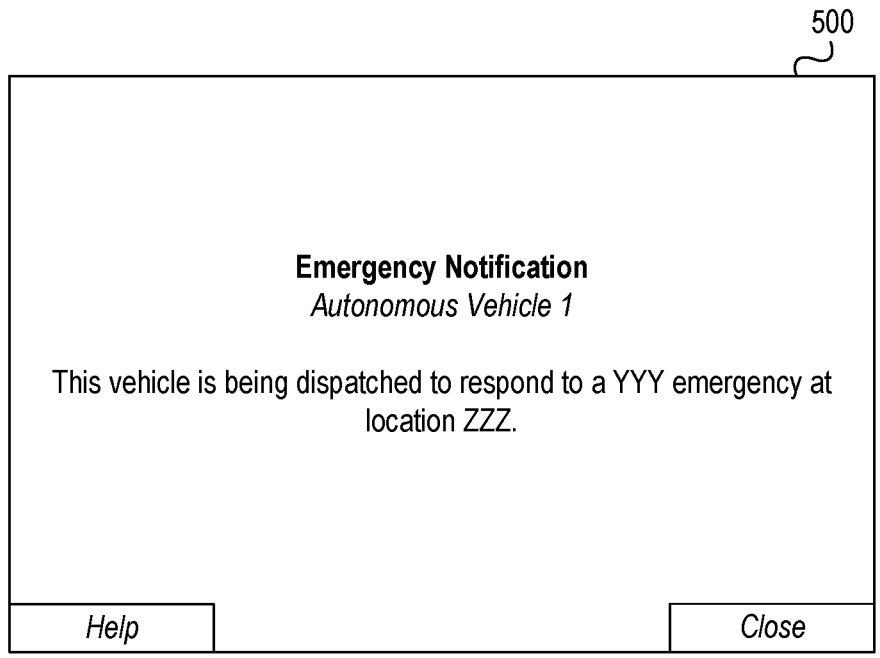

In some instances, in sending the one or more dispatch commands to the autonomous vehicle control system associated with the autonomous vehicle selected to respond to the emergency (e.g., on-board autonomous vehicle control system 170), vehicle management computing platform 110 may generate and/or send one or more graphical user interfaces to on-board autonomous vehicle control system 170, which may direct and/or cause on-board autonomous vehicle control system 170 to display and/or otherwise present the one or more graphical user interfaces generated by vehicle management computing platform 110. For example, in sending the one or more dispatch commands to on-board autonomous vehicle control system 170, vehicle management computing platform 110 may cause on-board autonomous vehicle control system 170 to display and/or otherwise present a graphical user interface similar to graphical user interface 500, which is illustrated in FIG. 5. As seen in FIG. 5, graphical user interface 500 may include text and/or other information notifying a user of on-board autonomous vehicle control system 170 (who may, e.g., be a passenger in the autonomous vehicle with which on-board autonomous vehicle control system 170 is associated) that the autonomous vehicle is being directed to respond to an emergency (e.g., "This vehicle is being dispatched to respond to a YYY emergency at location ZZZ").

At step 223, vehicle management computing platform 110 may determine that an additional autonomous vehicle is needed to respond to the emergency and/or select an additional autonomous vehicle to respond to the emergency. For example, at step 223, vehicle management computing platform 110 may select a second autonomous vehicle to respond to the emergency at the first location based on the autonomous vehicle state information. In some instances, vehicle management computing platform 110 may determine that an additional autonomous vehicle is needed to respond to the emergency and/or select an additional autonomous vehicle to respond to the emergency based on the type of emergency that has been detected, based on vehicle data received from one or more vehicle systems (e.g., on-board vehicle monitoring system 150, on-board vehicle monitoring system 160, on-board autonomous vehicle control system 170, on-board autonomous vehicle control system 180), based on vehicle state information, based on environment state information, and/or based on other information and/or factors. For instance, the additional autonomous vehicle may be located farther away from the location where the emergency has been detected than the vehicle that was initially selected, but the additional autonomous vehicle may have additional supplies that may be needed to respond to the emergency.

At step 224, vehicle management computing platform 110 may generate one or more dispatch commands for the additional autonomous vehicle. For example, at step 224, vehicle management computing platform 110 may generate one or more dispatch commands directing the second autonomous vehicle to move to the first location and execute one or more emergency response functions. Vehicle management computing platform 110 may, for instance, generate such dispatch commands for the additional autonomous vehicle similar to how vehicle management computing platform 110 may generate one or more dispatch commands at step 221, as discussed above.

Figure 2G:
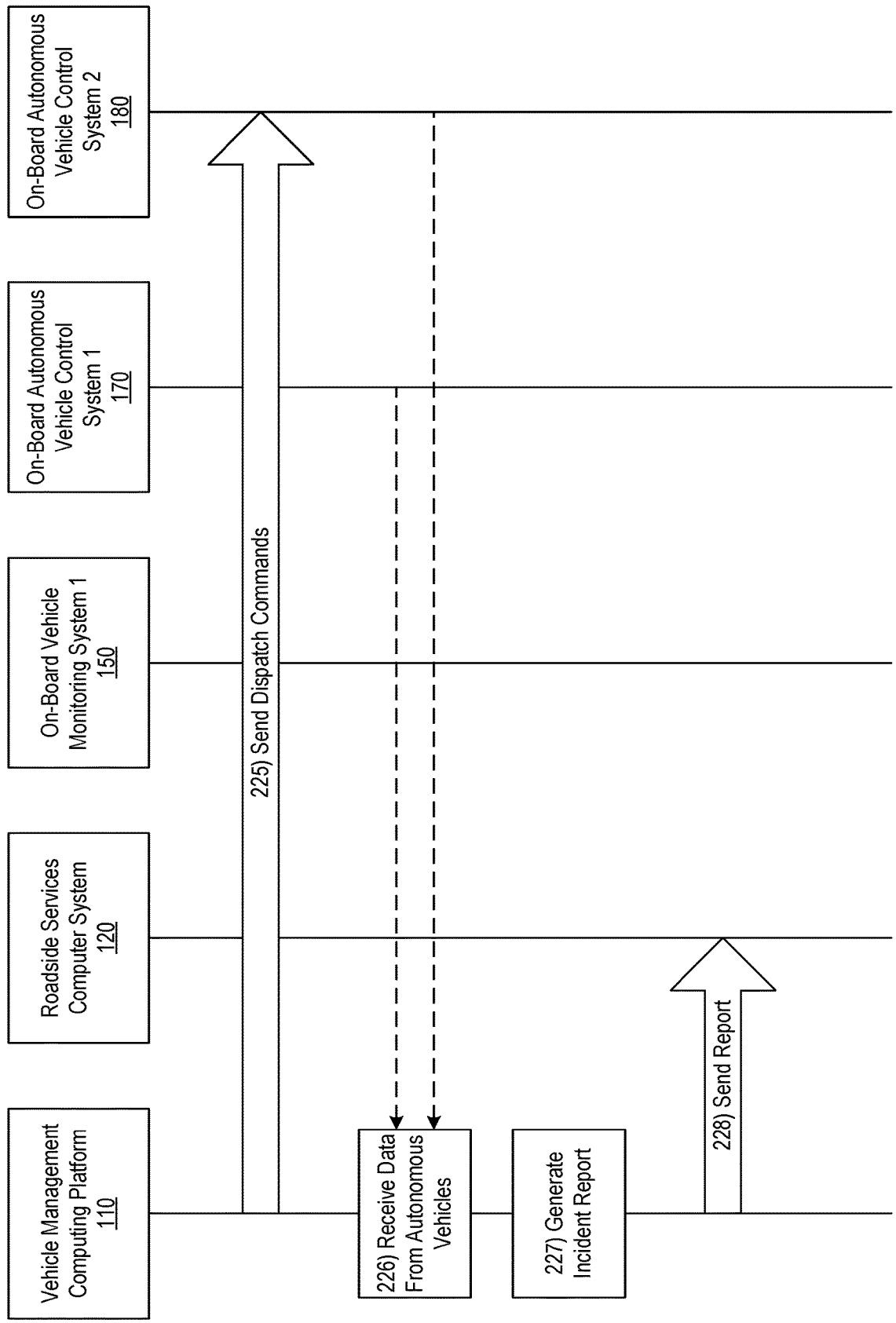

Referring to FIG. 2G, at step 225, vehicle management computing platform 110 may send the one or more dispatch commands generated for the additional autonomous vehicle to the additional autonomous vehicle. For example, at step 225, vehicle management computing platform 110 may send, via the communication interface (e.g., communication interface 115), to a second on-board autonomous vehicle control system associated with the second autonomous vehicle (e.g., on-board autonomous vehicle control system 180), the one or more dispatch commands directing the second autonomous vehicle to move to the first location and execute the one or more emergency response functions. For instance, vehicle management computing platform 110 may, at step 225, send the one or more dispatch commands to on-board autonomous vehicle control system 180. In response to receiving the one or more dispatch commands from vehicle management computing platform 110, on-board autonomous vehicle control system 180 may, for example, move the autonomous vehicle in which on-board autonomous vehicle control system 180 is installed to the first location and execute the one or more emergency response functions in accordance with the one or more dispatch commands received from vehicle management computing platform 110.

Figure 6:
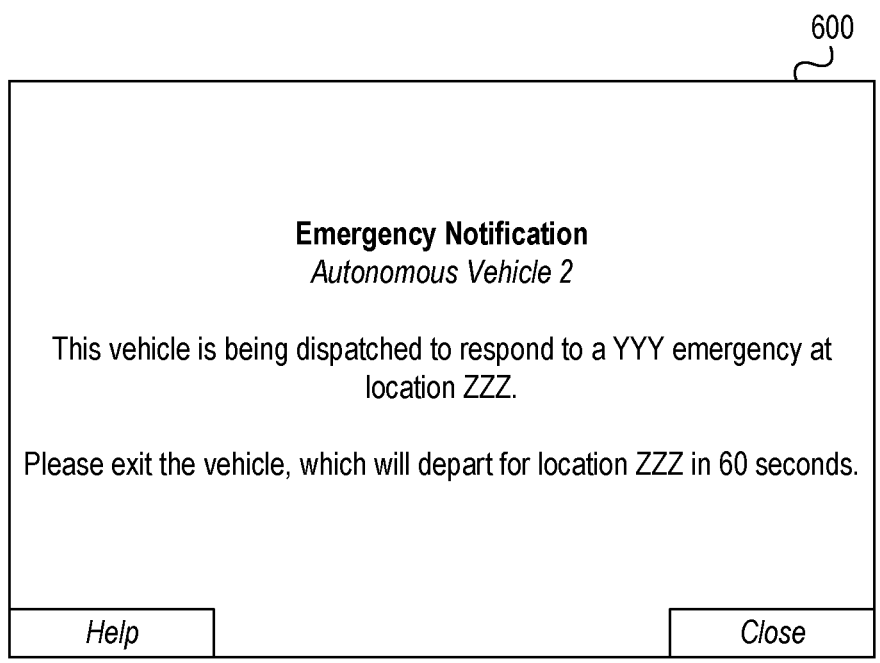

In some instances, in sending the one or more dispatch commands to the autonomous vehicle control system associated with the additional autonomous vehicle selected to respond to the emergency (e.g., on-board autonomous vehicle control system 180), vehicle management computing platform 110 may generate and/or send one or more graphical user interfaces to on-board autonomous vehicle control system 180, which may direct and/or cause on-board autonomous vehicle control system 180 to display and/or otherwise present the one or more graphical user interfaces generated by vehicle management computing platform 110. For example, in sending the one or more dispatch commands to on-board autonomous vehicle control system 180, vehicle management computing platform 110 may cause on-board autonomous vehicle control system 180 to display and/or otherwise present a graphical user interface similar to graphical user interface 600, which is illustrated in FIG. 6. As seen in FIG. 6, graphical user interface 600 may include text and/or other information notifying a user of on-board autonomous vehicle control system 180 (who may, e.g., be a passenger in the autonomous vehicle with which on-board autonomous vehicle control system 180 is associated) that the autonomous vehicle is being directed to respond to an emergency (e.g., "This vehicle is being dispatched to respond to a YYY emergency at location ZZZ; Please exit the vehicle, which will depart for location ZZZ in 60 seconds").

At step 226, vehicle management computing platform 110 may receive data from one or more autonomous vehicles and/or one or more autonomous vehicle control systems associated with such autonomous vehicles (e.g., on-board autonomous vehicle control system 170, on-board autonomous vehicle control system 180). For example, at step 226, vehicle management computing platform 110 may receive, via the communication interface (e.g., communication interface 115), from the first on-board autonomous vehicle control system associated with the first autonomous vehicle (e.g., on-board autonomous vehicle control system 170), incident data collected by the first on-board autonomous vehicle control system associated with the first autonomous vehicle (e.g., on-board autonomous vehicle control system 170) at the first location. Such incident data may, for instance, include information identifying the nature of the emergency, information identifying which supplies were used in responding to the emergency, information identifying how many supplies were used in responding to the emergency, claims processing information collected by the first on-board autonomous vehicle control system associated with the first autonomous vehicle (e.g., on-board autonomous vehicle control system 170) in responding to the emergency, and/or other information collected by the first on-board autonomous vehicle control system associated with the first autonomous vehicle (e.g., on-board autonomous vehicle control system 170) and/or associated with the emergency.

In some embodiments, the incident data collected by the first on-board autonomous vehicle control system associated with the first autonomous vehicle at the first location may include information identifying one or more supplies used at the first location in responding to the emergency at the first location, information identifying a nature of the emergency at the first location, or claims processing information received by the first on-board autonomous vehicle control system associated with the first autonomous vehicle at the first location. For example, the incident data collected by the first on-board autonomous vehicle control system associated with the first autonomous vehicle (e.g., on-board autonomous vehicle control system 170) at the first location may include information identifying one or more supplies used at the first location in responding to the emergency at the first location, information identifying a nature of the emergency at the first location, or claims processing information received by the first on-board autonomous vehicle control system associated with the first autonomous vehicle (e.g., on-board autonomous vehicle control system 170) at the first location.

At step 227, vehicle management computing platform 110 may generate an incident report based on the data received from the one or more autonomous vehicles and/or the one or more autonomous vehicle control systems associated with such autonomous vehicles (e.g., on-board autonomous vehicle control system 170, on-board autonomous vehicle control system 180). For example, at step 227, vehicle management computing platform 110 may generate an incident report based on the incident data received from the first on-board autonomous vehicle control system associated with the first autonomous vehicle (e.g., on-board autonomous vehicle control system 170).

At step 228, vehicle management computing platform 110 may send the incident report to emergency services computer system 120. For example, at step 228, vehicle management computing platform 110 may send, via the communication interface (e.g., communication interface 115), to an emergency services computer system (e.g., emergency services computer system 120), the incident report generated by vehicle management computing platform 110 based on the incident data received from the first on-board autonomous vehicle control system associated with the first autonomous vehicle (e.g., on-board autonomous vehicle control system 170). In addition, sending the incident report generated based on the incident data received from the first on-board autonomous vehicle control system associated with the first autonomous vehicle to the emergency services computer system may cause the emergency services computer system to display the incident report generated based on the incident data received from the first on-board autonomous vehicle control system associated with the first autonomous vehicle. For example, in sending the incident report generated based on the incident data received from the first on-board autonomous vehicle control system associated with the first autonomous vehicle (e.g., on-board autonomous vehicle control system 170) to the emergency services computer system (e.g., emergency services computer system 120), vehicle management computing platform 110 may cause the emergency services computer system (e.g., emergency services computer system 120) to display the incident report generated based on the incident data received from the first on-board autonomous vehicle control system associated with the first autonomous vehicle (e.g., on-board autonomous vehicle control system 170). For instance, vehicle management computing platform 110 may direct and/or otherwise cause emergency services computer system 120 to display and/or otherwise present the incident report, send the incident report to one or more interested parties and/or review teams, update one or more records and/or policy information, initiate claims processing activities, and/or perform other functions.

Figure 7:
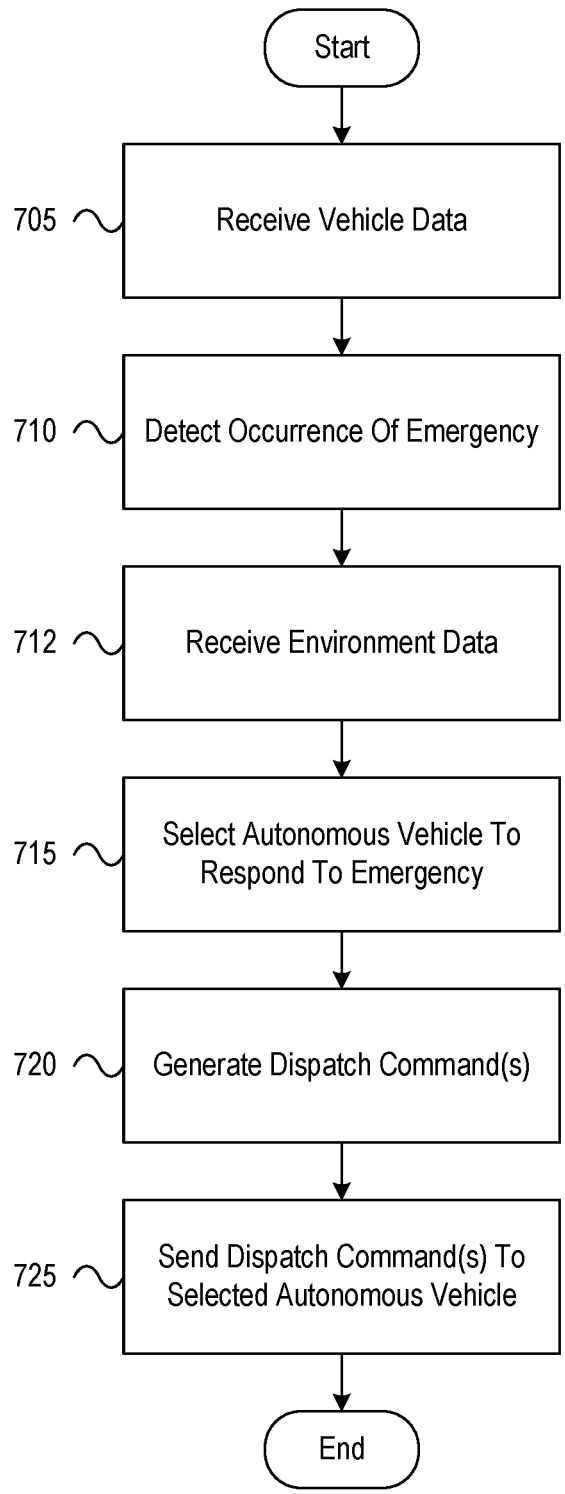
FIG. 7 depicts an illustrative method for controlling autonomous vehicles to provide automated emergency response functions in accordance with one or more example embodiments.

FIG. 7 depicts an illustrative method for controlling autonomous vehicles to provide automated emergency response functions in accordance with one or more example embodiments. Referring to FIG. 7, at step 705, a computing platform having at least one processor, a memory, and a communication interface may receive, via the communication interface, vehicle data associated with a first vehicle from a first on-board vehicle monitoring system associated with the first vehicle. At step 710, the computing platform may detect an occurrence of an emergency at a first location based on the vehicle data associated with the first vehicle received from the first on-board vehicle monitoring system associated with the first vehicle. At step 712, the computing platform may receive environment data. For example, at step 712, the computing platform may receive environment data from an environmental data computer system. The computing platform may analyze the environment data, the vehicle data, and/or other data to generate autonomous vehicle state information, generate environment state information, determine a type of emergency, and/or determine a type of response required for the emergency. At step 715, the computing platform may select a first autonomous vehicle to respond to the emergency at the first location based on autonomous vehicle state information. For example, at step 715, the computing platform may select one or more autonomous vehicles to respond to the emergency based on autonomous vehicle state information associated with the one or more autonomous vehicles and environment state information. At step 720, the computing platform may generate one or more dispatch commands directing the first autonomous vehicle to move to the first location and execute one or more emergency response functions. For example, at step 720, the computing platform may generate one or more dispatch commands directing the one or more autonomous vehicles selected to respond to the emergency to move to a particular location and execute one or more emergency response functions. At step 725, the computing platform may send, via the communication interface, to a first on-board autonomous vehicle control system associated with the first autonomous vehicle, the one or more dispatch commands directing the first autonomous vehicle to move to the first location and execute the one or more emergency response functions. For example, at step 725, the computing platform may send, to one or more autonomous vehicle control systems associated with the one or more autonomous vehicles selected to respond to the emergency, the one or more dispatch commands directing the one or more autonomous vehicles selected to respond to the emergency to move to the particular location and execute one or more emergency response functions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, via the communication interface, vehicle data associated with a first vehicle from a first on-board vehicle monitoring system associated with the first vehicle;
   detect an occurrence of an incident at a first location based on the vehicle data associated with the first vehicle received from the first on-board vehicle monitoring system associated with the first vehicle;
   select a first autonomous vehicle to respond to the incident at the first location based on autonomous vehicle state information;
   generate one or more dispatch commands directing the first autonomous vehicle to move to the first location and execute one or more response functions; and
   send, via the communication interface, to a first on-board autonomous vehicle control system associated with the first autonomous vehicle, the one or more dispatch commands directing the first autonomous vehicle to move to the first location and execute the one or more response functions,
   wherein sending the one or more dispatch commands to the first on-board autonomous vehicle control system associated with the first autonomous vehicle causes the first on-board autonomous vehicle control system associated with the first autonomous vehicle to drive the first autonomous vehicle to the first location.

2. The computing platform of claim 1, wherein the vehicle data associated with the first vehicle received from the first on-board vehicle monitoring system associated with the first vehicle comprises location data associated with the first vehicle, telematics data associated with the first vehicle, and sensor data associated with the first vehicle.

3. The computing platform of claim 1, wherein the incident at the first location is a natural disaster.

4. The computing platform of claim 1, wherein the incident at the first location is an automobile accident involving the first vehicle.

5. The computing platform of claim 1, wherein detecting the occurrence of the incident at the first location comprises detecting the occurrence of the incident at the first location based on vehicle data associated with the first autonomous vehicle received from the first on-board autonomous vehicle control system associated with the first autonomous vehicle.

6. The computing platform of claim 1, wherein detecting the occurrence of the incident at the first location comprises detecting the occurrence of the incident at the first location based on a disaster alert received from an emergency alert computer system.

7. The computing platform of claim 1, wherein selecting the first autonomous vehicle to respond to the incident at the first location based on the autonomous vehicle state information comprises determining, based on the autonomous vehicle state information, that the first autonomous vehicle is the closest available autonomous vehicle to the first location of a plurality of available autonomous vehicles within a predetermined distance of the first location.

8. The computing platform of claim 1, wherein generating the one or more dispatch commands directing the first autonomous vehicle to move to the first location and execute the one or more response functions comprises generating at least one dispatch command directing the first autonomous vehicle to deliver emergency supplies to the first location, provide medical functions at the first location, capture one or more pictures at the first location, collect claims processing information at the first location, or provide emergency transport for one or more injured persons at the first location.

9. The computing platform of claim 1, wherein generating the one or more dispatch commands directing the first autonomous vehicle to move to the first location and execute the one or more response functions comprises generating at least one dispatch command directing the first autonomous vehicle to a supplies loading unit.

10. The computing platform of claim 1, wherein the memory stores additional computer-readable instructions that, when executed by the at least one processor, cause the computing platform to:
  receive, via the communication interface, from the first on-board vehicle monitoring system associated with the first vehicle, vehicle monitoring registration information associated with the first vehicle; and
  store the vehicle monitoring registration information associated with the first vehicle received from the first on-board vehicle monitoring system associated with the first vehicle in a vehicle management database maintained by the computing platform.

11. The computing platform of claim 1, wherein the memory stores additional computer-readable instructions that, when executed by the at least one processor, cause the computing platform to:
  receive, via the communication interface, from the first on-board autonomous vehicle control system associated with the first autonomous vehicle, autonomous vehicle registration information associated with the first autonomous vehicle; and
  store the autonomous vehicle registration information associated with the first autonomous vehicle received from the first on-board autonomous vehicle control system associated with the first autonomous vehicle in a vehicle management database maintained by the computing platform.

12. The computing platform of claim 11, wherein the memory stores additional computer-readable instructions that, when executed by the at least one processor, cause the computing platform to:
  receive, via the communication interface, from a second on-board autonomous vehicle control system associated with a second autonomous vehicle, autonomous vehicle registration information associated with the second autonomous vehicle; and
  store the autonomous vehicle registration information associated with the second autonomous vehicle received from the second on-board autonomous vehicle control system associated with the second autonomous vehicle in the vehicle management database maintained by the computing platform.

13. The computing platform of claim 1, wherein the memory stores additional computer-readable instructions that, when executed by the at least one processor, cause the computing platform to:
  generate, for a plurality of autonomous vehicles, a plurality of polling requests requesting updated state information from a plurality of on-board autonomous vehicle control systems associated with the plurality of autonomous vehicles;
  send, via the communication interface, to the plurality of on-board autonomous vehicle control systems associated with the plurality of autonomous vehicles, the plurality of polling requests requesting the updated state information from the plurality of on-board autonomous vehicle control systems associated with the plurality of autonomous vehicles;
  receive, via the communication interface, from the plurality of on-board autonomous vehicle control systems associated with the plurality of autonomous vehicles, a plurality of polling responses; and
  generate the autonomous vehicle state information based on the plurality of polling responses received from the plurality of on-board autonomous vehicle control systems associated with the plurality of autonomous vehicles.

14. The computing platform of claim 1, wherein the memory stores additional computer-readable instructions that, when executed by the at least one processor, cause the computing platform to:
  generate environment state information based on environment data received from an environmental data computer system,
  wherein generating the one or more dispatch commands directing the first autonomous vehicle to move to the first location and execute the one or more response functions comprises generating at least one dispatch command based on the environment state information.

15. The computing platform of claim 1, wherein the memory stores additional computer-readable instructions that, when executed by the at least one processor, cause the computing platform to:
  select a second autonomous vehicle to respond to the incident at the first location based on the autonomous vehicle state information;
  generate one or more dispatch commands directing the second autonomous vehicle to move to the first location and execute one or more response functions; and
  send, via the communication interface, to a second on-board autonomous vehicle control system associated with the second autonomous vehicle, the one or more dispatch commands directing the second autonomous vehicle to move to the first location and execute the one or more response functions.

16. The computing platform of claim 1, wherein the memory stores additional computer-readable instructions that, when executed by the at least one processor, cause the computing platform to:
  receive, via the communication interface, from the first on-board autonomous vehicle control system associated with the first autonomous vehicle, incident data collected by the first on-board autonomous vehicle control system associated with the first autonomous vehicle at the first location.

17. The computing platform of claim 16, wherein the incident data collected by the first on-board autonomous vehicle control system associated with the first autonomous vehicle at the first location comprises information identifying one or more supplies used at the first location in responding to the incident at the first location, information identifying a nature of the incident at the first location, or claims processing information received by the first on-board autonomous vehicle control system associated with the first autonomous vehicle at the first location.

18. The computing platform of claim 16, wherein the memory stores additional computer-readable instructions that, when executed by the at least one processor, cause the computing platform to:
  generate an incident report based on the incident data received from the first on-board autonomous vehicle control system associated with the first autonomous vehicle; and
  send, via the communication interface, to an emergency services computer system, the incident report generated based on the incident data received from the first on-board autonomous vehicle control system associated with the first autonomous vehicle, wherein sending the incident report generated based on the incident data received from the first on-board autonomous vehicle control system associated with the first autonomous vehicle to the emergency services computer system causes the emergency services computer system to display the incident report generated based on the incident data received from the first on-board autonomous vehicle control system associated with the first autonomous vehicle.

19. A method comprising:

at a computing platform comprising at least one processor, memory, and a communication interface:
- receiving, by the at least one processor, via the communication interface, vehicle data associated with a first vehicle from a first on-board vehicle monitoring system associated with the first vehicle;
- detecting, by the at least one processor, an occurrence of an incident at a first location based on the vehicle data associated with the first vehicle received from the first on-board vehicle monitoring system associated with the first vehicle;
- selecting, by the at least one processor, a first autonomous vehicle to respond to the incident at the first location based on autonomous vehicle state information;
- generating, by the at least one processor, one or more dispatch commands directing the first autonomous vehicle to move to the first location and execute one or more response functions; and
- sending, by the at least one processor, via the communication interface, to a first on-board autonomous vehicle control system associated with the first autonomous vehicle, the one or more dispatch commands directing the first autonomous vehicle to move to the first location and execute the one or more response functions, wherein sending the one or more dispatch commands to the first on-board autonomous vehicle control system associated with the first autonomous vehicle causes the first on-board autonomous vehicle control system associated with the first autonomous vehicle to drive the first autonomous vehicle to the first location, and wherein detecting the occurrence of the incident at the first location comprises detecting the occurrence of the incident at the first location based on vehicle data associated with the first autonomous vehicle received from the first on-board autonomous vehicle control system associated with the first autonomous vehicle.

20. One or more non-transitory computer-readable media storing instructions that, when executed by a computing platform comprising at least one processor, memory, and a communication interface, cause the computing platform to:
- receive, via the communication interface, vehicle data associated with a first vehicle from a first on-board vehicle monitoring system associated with the first vehicle;
- detect an occurrence of an incident at a first location based on the vehicle data associated with the first vehicle received from the first on-board vehicle monitoring system associated with the first vehicle;
- select a first autonomous vehicle to respond to the incident at the first location based on autonomous vehicle state information;
- generate one or more dispatch commands directing the first autonomous vehicle to move to the first location and execute one or more response functions; and
- send, via the communication interface, to a first on-board autonomous vehicle control system associated with the first autonomous vehicle, the one or more dispatch commands directing the first autonomous vehicle to move to the first location and execute the one or more response functions, wherein sending the one or more dispatch commands to the first on-board autonomous vehicle control system associated with the first autonomous vehicle causes the first on-board autonomous vehicle control system associated with the first autonomous vehicle to drive the first autonomous vehicle to the first location, and wherein selecting the first autonomous vehicle to respond to the incident at the first location based on the autonomous vehicle state information comprises determining, based on the autonomous vehicle state information, that the first autonomous vehicle is the closest available autonomous vehicle to the first location of a plurality of available autonomous vehicles within a predetermined distance of the first location.

* * * * *